United States Patent
Ramarao et al.

(10) Patent No.: US 9,497,136 B1
(45) Date of Patent: Nov. 15, 2016

(54) METHOD AND SYSTEM FOR PROVIDING USAGE METRICS TO MANAGE UTILZATION OF CLOUD COMPUTING RESOURCES

(75) Inventors: Shreenidhi Ramarao, Bangalore (IN); Ilan Ginzburg, St Pancrasse (FR); Feng Guo, Shanghai (CN)

(73) Assignee: EMC CORPORATION, Hopkinton, MA (US)

( * ) Notice: Subject to any disclaimer, the term of this patent is extended or adjusted under 35 U.S.C. 154(b) by 279 days.

(21) Appl. No.: 13/247,505

(22) Filed: Sep. 28, 2011

(51) Int. Cl.
| | | |
|---|---|---|
| *G06F 9/46* | (2006.01) | |
| *H04L 12/911* | (2013.01) | |
| *G06F 9/50* | (2006.01) | |
| *G06F 9/455* | (2006.01) | |
| *H04L 29/08* | (2006.01) | |

(52) U.S. Cl.
CPC ........... *H04L 47/70* (2013.01); *G06F 9/45533* (2013.01); *G06F 9/45558* (2013.01); *G06F 9/5072* (2013.01); *H04L 47/78* (2013.01); *G06F 9/5027* (2013.01); *H04L 67/1008* (2013.01); *H04L 67/1031* (2013.01)

(58) Field of Classification Search
None
See application file for complete search history.

(56) References Cited

U.S. PATENT DOCUMENTS

| | | | |
|---|---|---|---|
| 7,412,492 | B1* | 8/2008 | Waldspurger ................. 709/216 |
| 8,250,582 | B2* | 8/2012 | Agarwala et al. ............ 718/104 |
| 8,478,848 | B2* | 7/2013 | Minert ......................... 709/221 |
| 2008/0086353 | A1* | 4/2008 | Motwani et al. ................. 705/9 |
| 2009/0293056 | A1* | 11/2009 | Ferris ............................... 718/1 |
| 2010/0161827 | A1* | 6/2010 | Griesmer et al. ............ 709/232 |
| 2010/0251002 | A1* | 9/2010 | Sivasubramanian et al. .... 714/2 |

* cited by examiner

*Primary Examiner* — Wissam Rashid
(74) *Attorney, Agent, or Firm* — Dergosits & Noah LLP; Todd A. Noah

(57) ABSTRACT

A management console application provides a dashboard which centralizes data from and access to one or more other applications. In a specific implementation, the dashboard displays resource utilization and tracking data generated by a first application, an application execution map generated by a second application that identifies the resources on which a third application is executing, or both.

17 Claims, 18 Drawing Sheets

METHOD AND SYSTEM FOR PROVIDING USAGE METRICS TO MANAGE UTILZATION OF CLOUD COMPUTING RESOURCES

BACKGROUND

The present invention relates to the field of information technology, including, more particularly, to systems and techniques for simplifying access to different applications.

Organizations look to their information technology (IT) department to plan, coordinate, and manage the computer-related activities of the organization. An IT department is responsible for upkeep, maintenance, and security of networks. This may include analyzing the computer and information needs of their organizations from an operational and strategic perspective and determining immediate and long-range personnel and resource requirements.

Monitoring the computer-related activities of the organization is an increasingly difficult task because the modern workplace is a complex blend of multiple users and multiple applications which combine into a complex and dynamically evolving environment. For example, at any given time multiple applications may be executing on multiple machines or "in the cloud." It can be hard to follow what is going on in the cloud, for an application, for a given user. Many organizations do not have systems for tracking how resources are used by applications and users.

Thus, there is a need to provide systems and techniques to manage computing resources.

DETAILED DESCRIPTION

Figure 1:
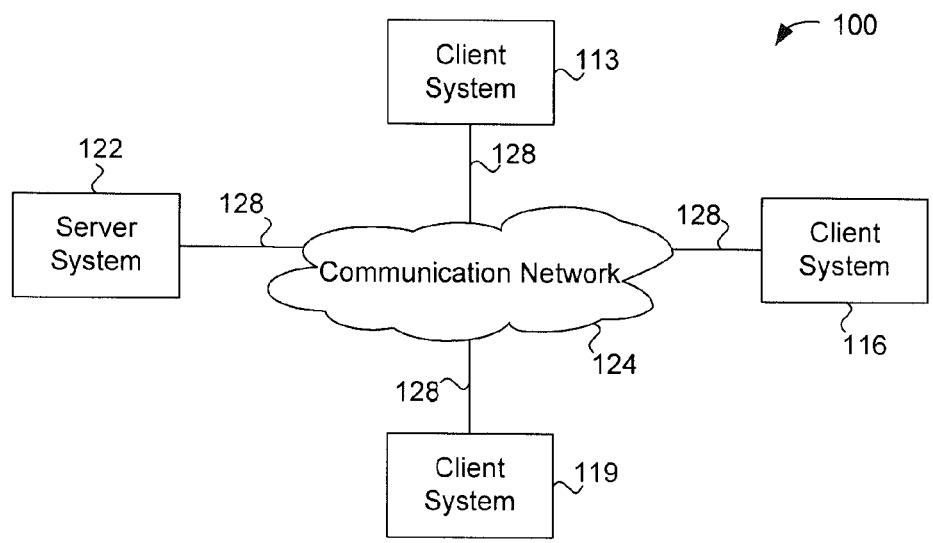
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
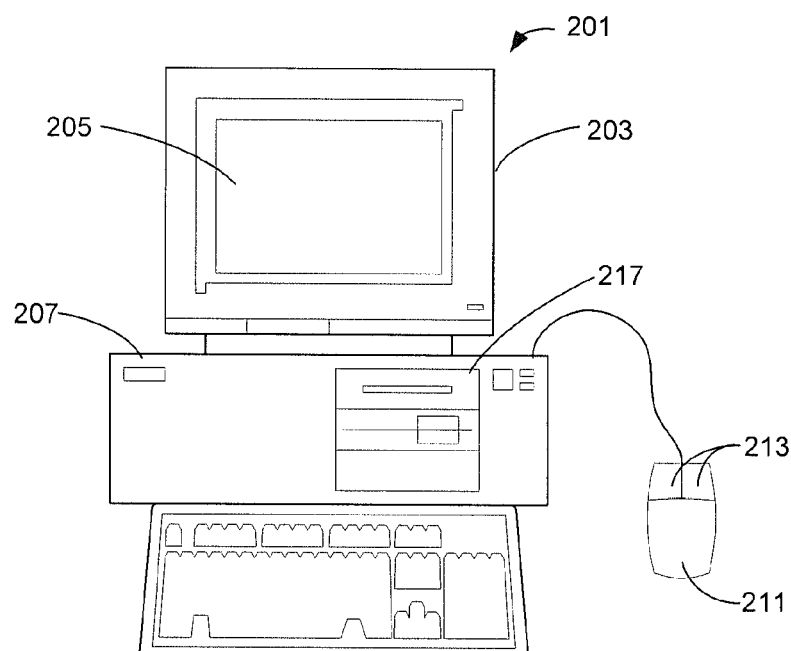
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
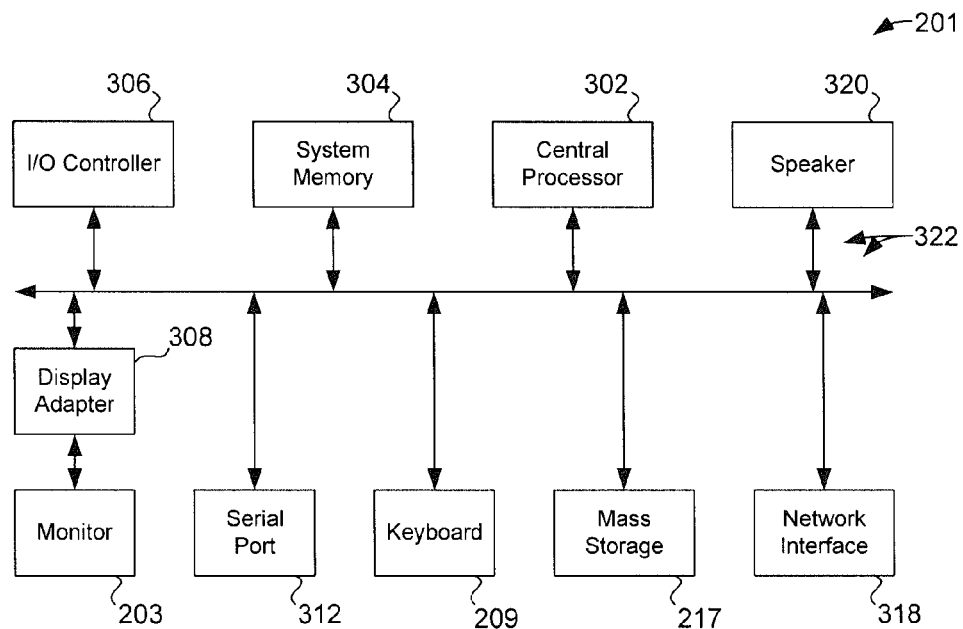
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, interne, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
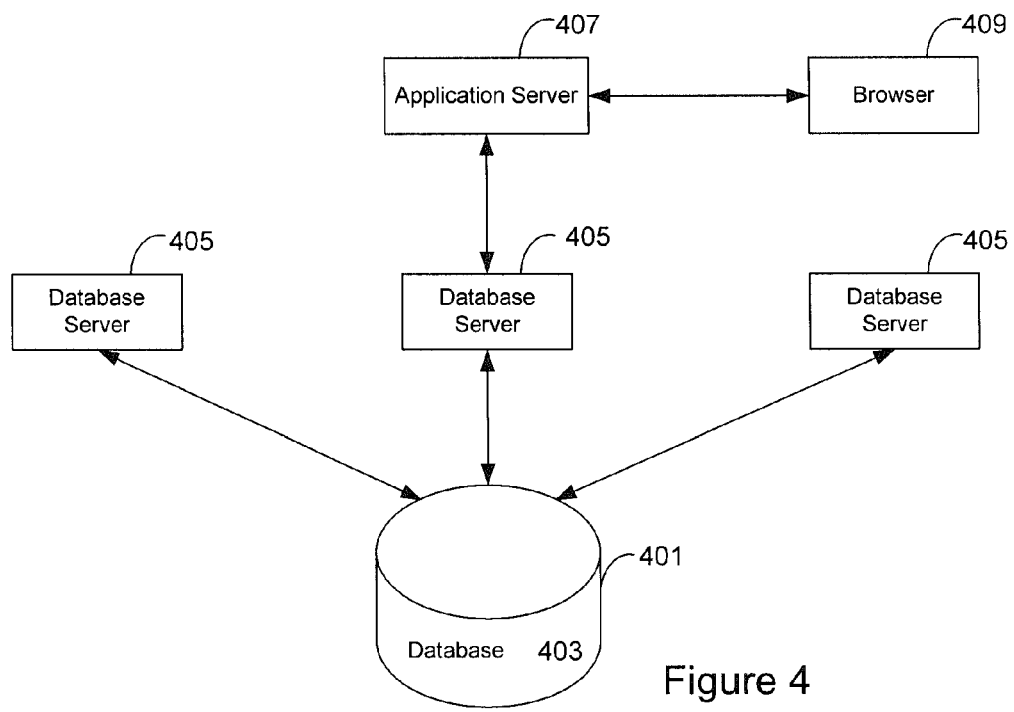
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
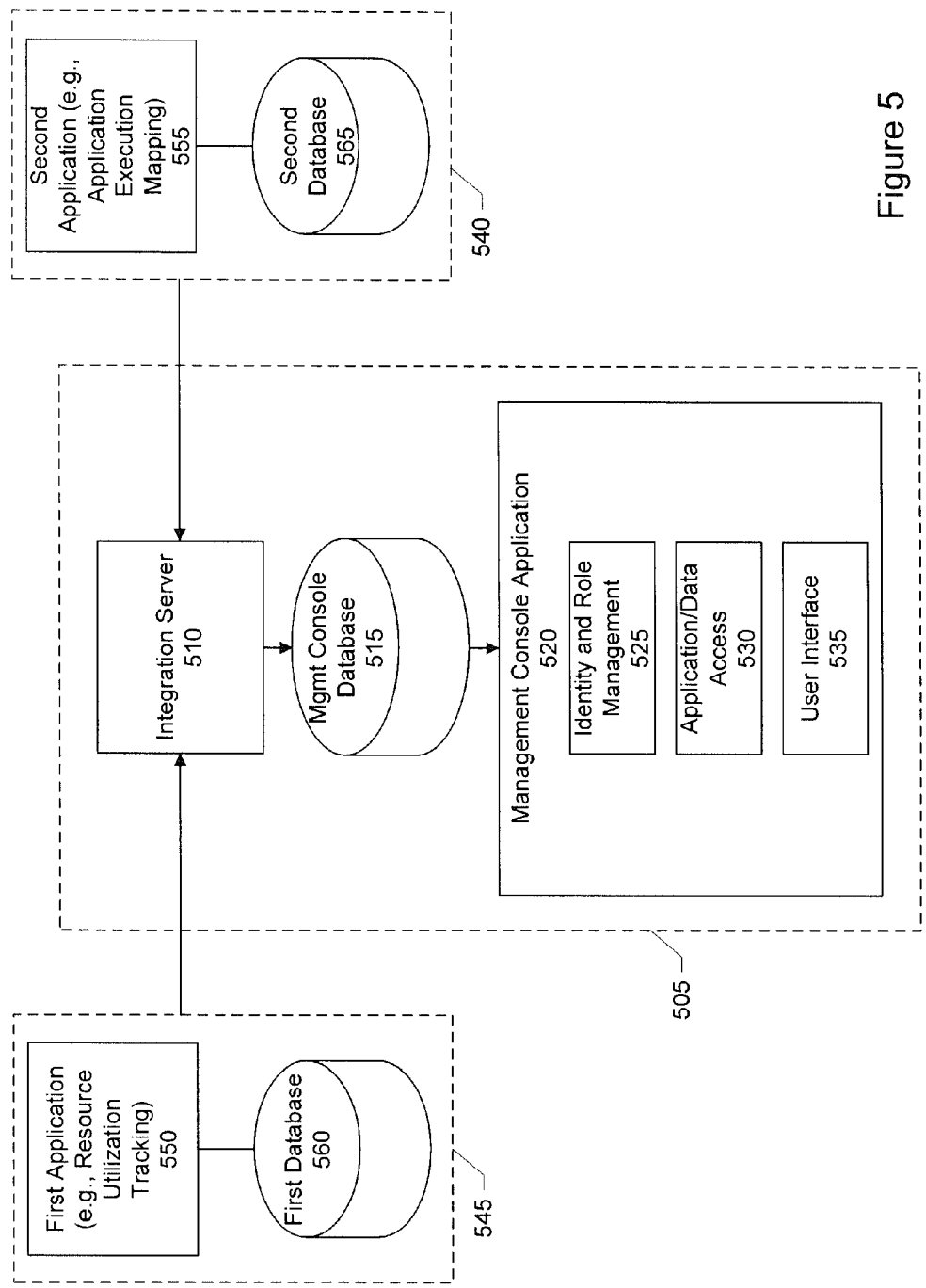
FIG. 5 shows a block diagram of an environment in which a management console system that collects data from other systems may be implemented.

FIG. 5 shows a block diagram in which a management console system 505 of the invention may be implemented. As shown in FIG. 5, in a specific implementation, the system includes an integration server 510, a management console database 515 coupled to the integration server, and a management console application 520 coupled to the database. The management console application includes several subsystems, components, modules, or interfaces such as an identity and role management component 525, an application/data access interface 530, and a user interface component 535.

In a specific implementation, the system provides a central cloud management console which streamlines formerly complex, time consuming, and error prone operations. In a specific implementation, the system communicates with external systems 540, 545, or both and presents the data generated by the systems through a single cloud management application program. The example of FIG. 5 shows two external systems. It should be appreciated, however, that there can be any number of external systems coupled to central cloud management system 505, such as one, two, three, four, five, or more than five systems. In another specific implementation, systems 540, 545 or both are combined into a single management console system 505.

In a specific implementation, a first application 550 from system 545 includes a cloud resource utilization tracking application. A second application 555 from system 540 includes an application execution mapping application. Resource reservation, tracking, and billing, as well as application and infrastructure mapping, control, and monitoring are typically orders of magnitude more complex in a cloud environment than in a data center running well-controlled applications.

Thus, this specific implementation provides a centralized management console or system with high availability on a distributed system. In this specific implementation, the management console includes identity management system for centralized authentication and authorization or role management. There can be a single console to access different applications through web services, application specific plug-ins, or both. This system can manage the data flow on the cloud from within the application and to/from the external applications to manage the complete workflow (e.g., request to billing and service). There can be a single window with user-specific roles and permissions for the workflow for many different departments such as sales, IT, management, or services.

The management console can act as a dashboard providing information on storage, network, utilization of resources, and helps to track resources such as virtual machines, storage, and the like on the cloud more efficiently. The console can act as a backbone to complete a business workflow and can help to minimize or reduce cost and time and increase quality. Centralizing cloud management can increase security which is desirable in cloud offerings. Having a centralized management console can reduce the number of different applications an organization may have, reduce maintenance difficulties and turnaround "time to customer," for providing a service, resolving a problem, or both. This can help to improve the "Total Customer Experience." In a specific implementation, there is a single management console for the private cloud, with monitoring and configuration of clustering, load balancing and high availability, server load reporting, and in general cloud inventory and load (e.g., network, routers, applications, and so forth). There may be a distributed mapping infrastructure providing dynamic maps of application execution, resource usage, user activity tracking or general cloud map. Dynamic mapping can be a building block for the management console and the resource tracking services.

In a specific implementation, the centralized management console system obtains data from external systems such as application execution mapping 555, cloud resource utilization tracking 550, or both. The system may be web-enabled. In this specific implementation, data integration from the one or more different external systems is provided through integration server 510. Integration server 510 may be referred to as a web method integration server. This server can push data to management console application database 515 running this console through database insert/update triggers from the other external system databases, such as databases 560 and 565.

As discussed above, a specific implementation of the system is with cloud resource utilization and tracking and application execution mapping. It should be appreciated, however, that the system may instead or additionally communicate with other types of applications such as customer relationship management (CRM) applications, supply chain management applications, risk and compliance management applications, and so forth.

A feature of system 505 includes "always-on" connectivity using clustered high-availability (HA) environments to help ensure no downtime for the cloud or private cloud. There can be load balancers, firewall setup and security settings for authentication and authorization. In a specific embodiment, system 505 is implemented using VMware for virtualization.

"Always-on" connectivity can help to ensure business continuity. As organizations move services to the cloud, the majority of the organization's and customer's critical business data is stored in the cloud. So, network downtime can shut down business operations. It is desirable that access to cloud services be available even during maintenance. Thus, cloud services as described in this application may implement high availability technologies and capabilities such as active/active clustering, dynamic server load balancing and ISP load balancing within the network infrastructure. A centralized management and network system built with network architecture for cloud services can help business continuity which is desirable for many organizations.

A centralized or single management console can also ease administration and reduce security threats. Generally, human error is a large facture in network security threat facing both physical and virtual computing environments. In some cases, organizations deploy additional network devices to secure their virtual networks. By doing this, organizations may exponentially increase their risk. Device management, administration, monitoring and configuration becomes more tedious and less organized. A central or single management console to manage, monitor and configure the devices (physical, virtual, and third-party) can help to reduce security threats and ease administration.

Identity and role management component 525 provides authentication and authorization to each of the intercommunicating applications. The centralized management console may be a web application which provides role-based access to applications. In a specific implementation, the component provides single sign-on (SSO) access. Single sign-on (SSO) is a property of access control of multiple related, but independent software systems. Through the SSO feature, a user can log in once and gain access to all systems without being prompted to log in again at each of them. A single sign-on configuration may include prompting the user for a user name and password, be based on Kerberos, smart card, one-time password (OTP) token, integrated Windows authentication, or combinations of these. In a specific implementation, authentication is via a biometric authentication. Biometric authentication includes techniques for recognizing humans based upon one or more intrinsic physical or behavioral traits. Some examples of biometric characteristics include fingerprint, face recognition, DNA, palm print, hand geometry, iris recognition, typing rhythm, or voice.

Figure 8:
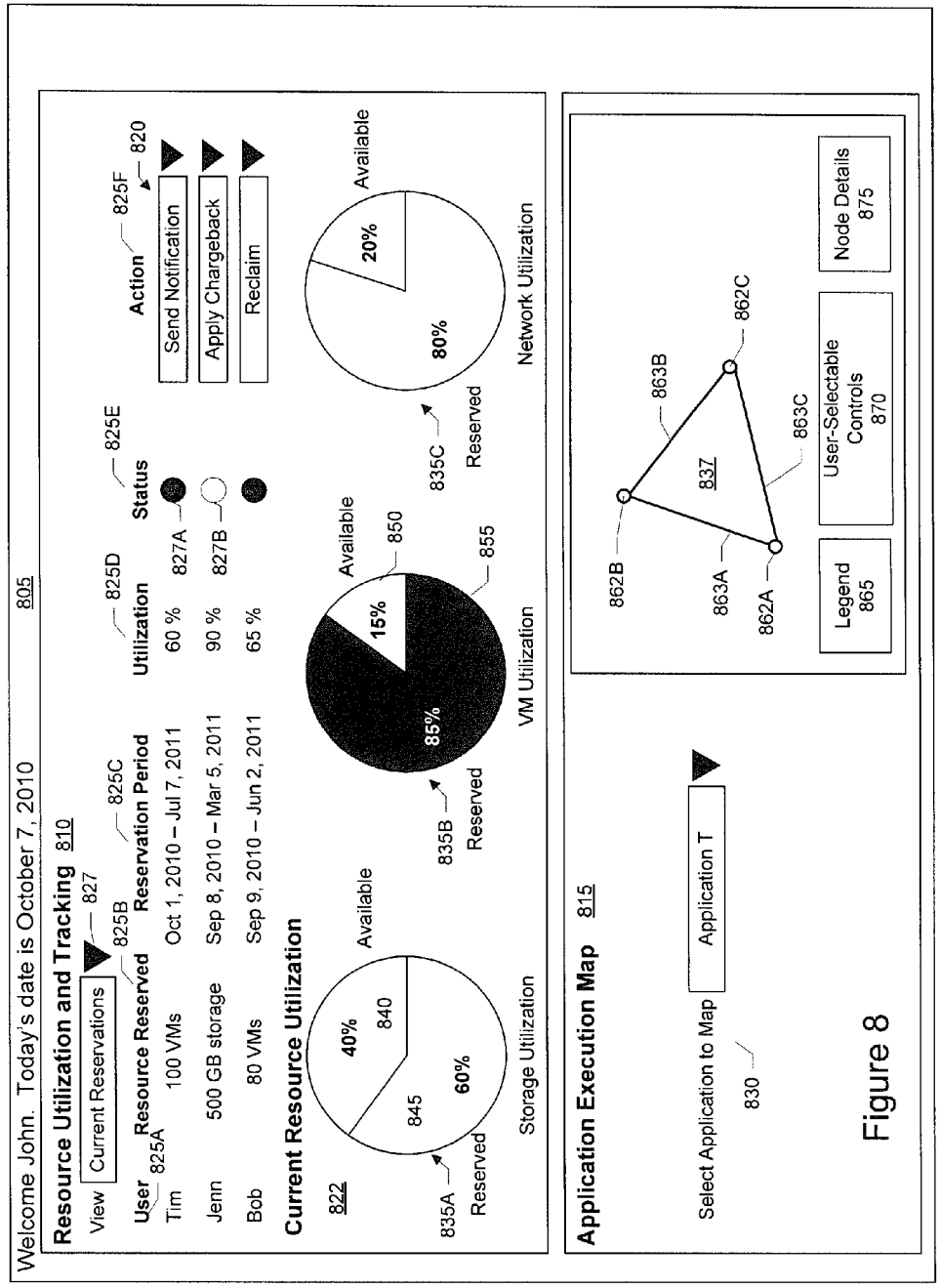
FIG. 8 shows an example of a dashboard screen of the management console system.

User interface 535 provides a graphical user interface (GUI) through which a user can interact with the management console application. FIG. 8 shows an example of a GUI. The interface may be referred to as a display, view, window, or dashboard. In a specific implementation, the interface includes a web page that is displayed within a browser. The interface may include graphical icons, elements, visual indicators, controls, user-controls, widgets, and the like.

Figure 6:
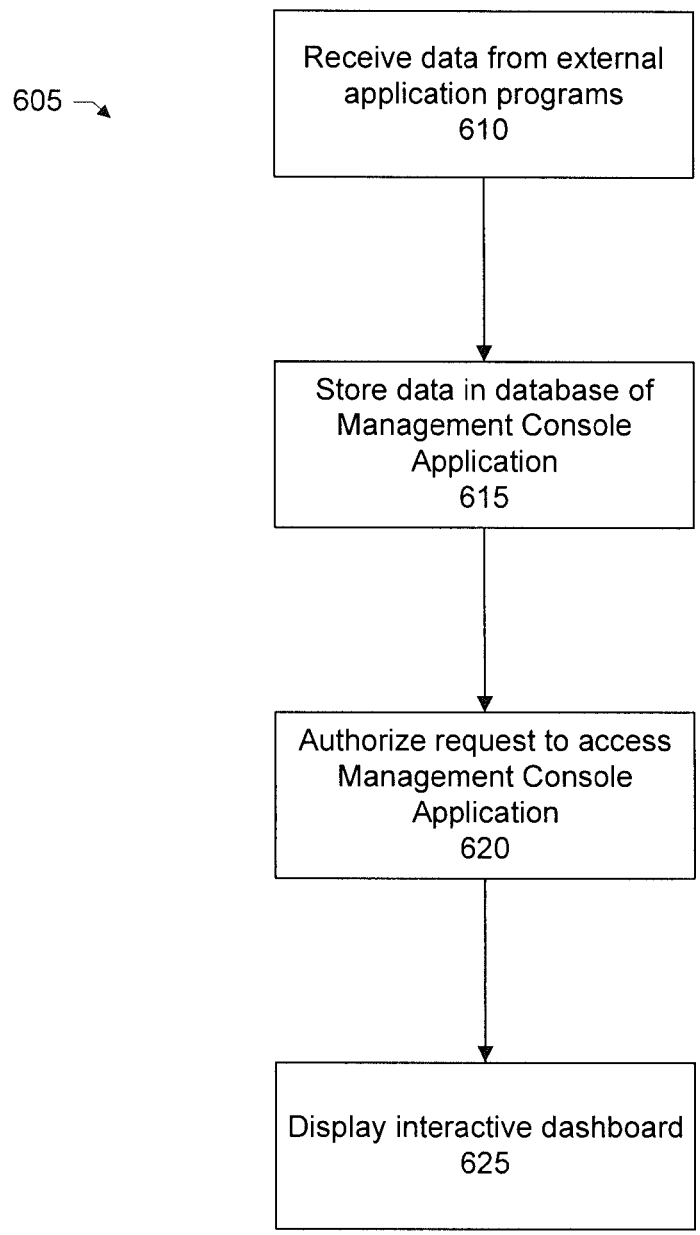
FIG. 6 shows an overall flow for generating a dashboard display of the management console system.

FIG. 6 shows an overflow diagram 605 for generating a centralized management console dashboard. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in a step 610, the system receives data from one or more external systems or applications. In a step 615, the data is stored in a database of the management console application. In a step 620, the system receives and authorizes a request to access the management console application. In a step 625, the system displays an interactive dashboard.

In a specific embodiment, receiving data from the one or more external applications (step 610) is implemented through database triggers. A database trigger is procedural code that is automatically executed in response to certain events on a particular table or view in a database. A trigger can be activated whenever a specified event, such as an insert event, delete event, or update event, occurs on a particular table. A trigger may have an activation time, such as before, after, or instead of the triggering event. In other words, triggers are procedures, which are stored in a database, and can be executed or "fired" when a table is modified. A trigger can specify a series of actions to be automatically performed when a specific event occurs.

In this specific embodiment, there is a mapping between one or more fields of an external database to one or more fields of the management console database. An event occurs at the external database involving the one or more fields of the external database. Based on a database trigger associated with the external database and the mapping, the event data is transmitted to and stored in the one or more fields of the management console database (step 615). To give an example here: say customer ABC reserves or rents 100 virtual machines (VMs) on a private cloud for some of his offerings. Consider this reservation application is an external one and may be a customer facing one having a different database. Now immediately after the order gets inserted there, based on a database trigger on a field in this application, integration server kicks off. This would have mapped two applications database to particular fields and send the data to centralized management console application DB. With the single console as described in this patent application, the user can see that ABC has reserved 100 VMs say for a year. That makes reserving, tracking, billing, etc. easy. When done, we can see which VMs need removal or renewal. Other benefits of the management console system can include continuous service to the customer, reducing turnaround time for demand and supply, facilitating billing. In an embodiment, there is a single console that helps monitor and control the whole workflow which in turn can influence and increase the total customer experience (TCE) and the net promoter score (NPS) which is desirable for organizations, companies, and businesses. Such a console can also help troubleshoot and debug application issues in a holistic way.

In step 620, a user (e.g., IT administrator) can log into the management console application, such as by entering a user name and password. Upon receipt of the login credentials and verification, the system permits, allows, or authorizes the access to the management console application.

In step 625, the system displays an interactive dashboard. The dashboard may include data generated by the one or more external applications. In a specific implementation, the management console application accesses management console database 515 which may include data collected from the one or more external applications. The dashboard may further include user-selectable controls to permit the user to interact with the external applications through the management console application.

Figure 7:
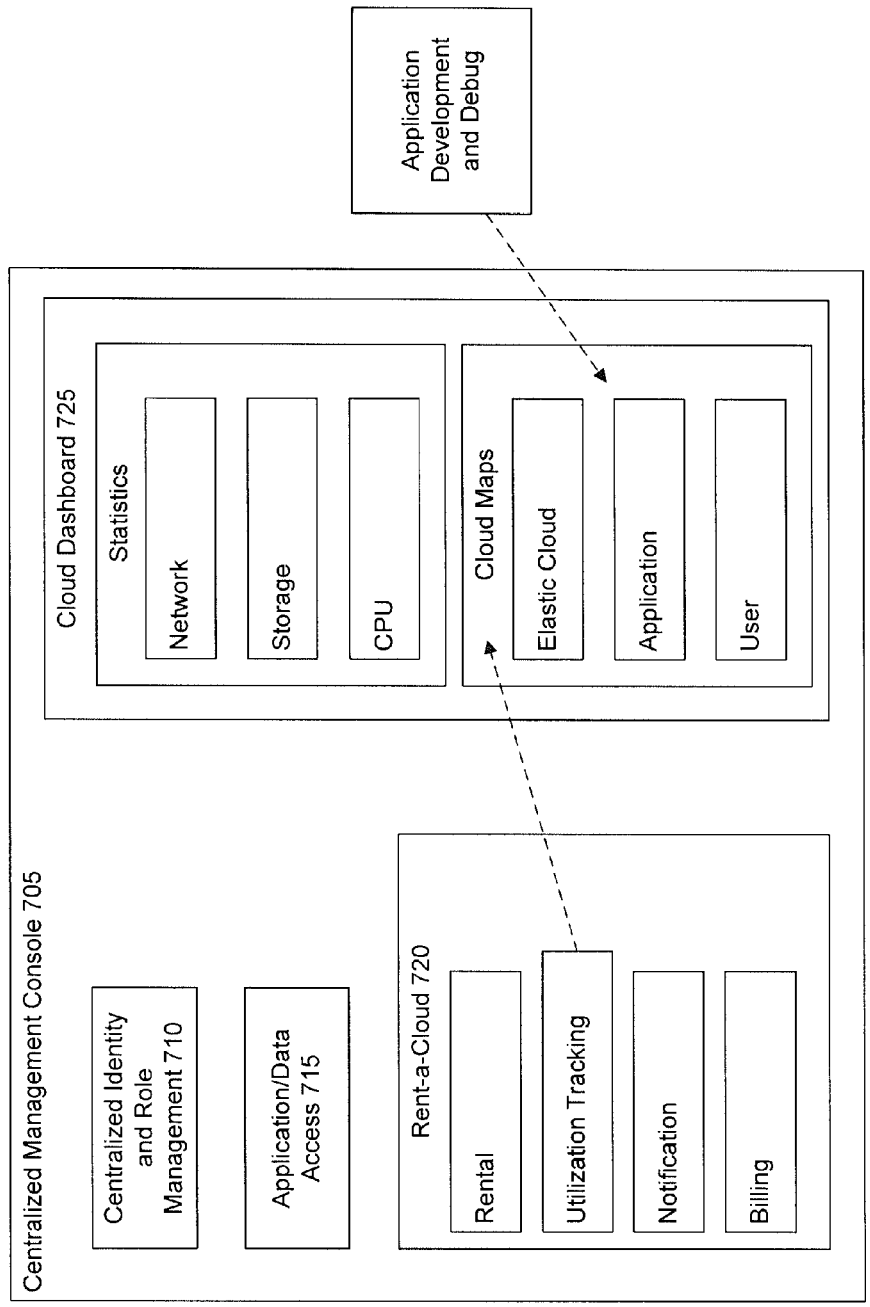
FIG. 7 shows a more detailed block diagram of the management console system.

FIG. 7 shows a block diagram of a specific implementation of the centralized management console system shown in FIG. 5. The system can centralize access to and data from any number of systems such as a first system 720, and a second system 725. In a specific implementation, the first system includes a rent-a-cloud service, and the second system includes a cloud dashboard having an application execution map.

The management console application allows consolidating of other products and adding value above what each individual products can provide. For example, resource reservation can be done using an external infrastructure, the resulting reserved set of resource is then communicated back into the management console and dynamically tracked during its lifetime. Data can be fed into an external billing and reporting system. The single console (with pluggable extensions) simplifies IT operations. Authorization and access management is more secure as it is done in a single place. The mapping infrastructure is also useful outside of the management console to get a more precise idea of application execution (e.g., debug, resource consumption, or security concerns). More particularly, resource reservation is generally not subsequently linked to resource usage monitoring (in a dynamic environment) and resource billing. High availability and clustering configuration and monitoring are usually application specific. When multiple applications execute in the cloud, IT workers may struggle with having multiple consoles and abstractions to manage all running applications. Dynamic application maps usually rely on diffusion networks and network monitoring. They are not capable of providing accurate maps of highly distributed applications executing in multiple different environments (e.g., cloud+data center+customer premises+remote database access, etc.).

In a specific implementation, rent-a-cloud provides a service that enables an end-user to rent IT resources in a self-service way and supports authorization process control. This service may track resource delivery by human input, an automatic way, or both so that a cloud administrator (e.g., private cloud administrator) can know who is occupying which resource. With the relationship between the end-user and cloud resource and the mapping relation between cloud resource and physical resource, which may be provided by a map component, there can be an end-to-end view about the end-user's occupancy of a physical resource in the cloud or private cloud environment. In a specific implementation, there is an integration of services e.g., VMware vSphere Web Services SDK, to monitor the resources utilization statistic. There can be delivery of an end-user's resource utilization statistic via mashuping the utilization statistic and the end-user's occupancy of resources. This statistic can be used as evidence for identifying resource waste and enabling the pay-for-what-you-use billing system In a specific implementation, cloud dashboard provides maps or application execution maps which can be used during application development and debug to get a better picture or determine where an application is executing. Usage of an application execution map, however, is not limited to the cloud environment, and when an application executes inside and outside the cloud, the map can show all the nodes. In a specific embodiment, implementation is done by network sniffing, installation of agents on participating machines, application instrumentation, or combinations of these. The methods can be combined as different environments have different constraints. There may be a centralizing infrastructure to gather the data sent in by the various monitoring agents. A map centralization service can be offered in the cloud or elsewhere.

FIG. 8 shows an example of a dashboard 805 of the management console system. The dashboard may be displayed as a Web page within a browser window. The dashboard may be an interactive dashboard. For example, a user may be able to click on a dashboard element to drill-down and see detail information or drill-up to see summary information. User-input controls may be provided which allow for sorting and filtering. This example of the dashboard includes a resource utilization and tracking section 810 and an application execution map section 815.

The resource utilization and tracking section includes a table 820 and a set of charts 822. Table 820 includes columns 825A-F. Column 825A lists users. Column 825B identifies the resources reserved by the users. Column 825C identifies the period for which the user reserved the resource. Column 825D displays metrics indicating utilization of the resource. Column 825E displays status to indicate whether or not utilization of the resource has fallen below a threshold level. Column 825F includes user-input controls to allow the logged in user to select an action. The table may include a user-input control 827 that allows the user to select a particular view or filter to, for example, view current reservations, view upcoming reservations, view reservations for a particular time period, show under-utilized resources, show resources by resource type (e.g., virtual machines versus storage), show resource reservations by user, show resource reservations by department, and so forth.

The dashboard data may be customized for a particular user or user role. In this example of the dashboard, there is a user "John" who is an IT administrator. Upon logging into the centralized management console application, dashboard 805 is displayed showing the various resources that the IT administrator "John" is responsible for and the status of those resources.

For example, as shown in a first row of the table, the IT administrator can see that there is a user "Tim" who has reserved 100 virtual machines for the period Oct. 1, 2010 to Jul. 7, 2011. The IT administrator can further see that Tim's current utilization of the resource is 60 percent. The utilization may be calculated as a ratio of an amount of resources used to an amount of resources reserved. As shown in a second row of the table, the IT administrator can see that there is a user "Jenn" who has reserved 500 GB of storage for the period Sep. 8, 2010 to Mar. 5, 2011. The IT administrator can further see that Jenn's current utilization of the resource is 90%.

Regarding user Tim, a 60 percent utilization may be below a threshold utilization level. For example, an organization may set a policy that users have at least 80 percent utilization of resources that they reserve. This can help to encourage efficient use of resources. In this example, a utilization of 60 percent is below the 80 percent threshold utilization level. Thus, status 825E displays a particular visual indicator to indicate that utilization is below the threshold level. The visual indicator can include a color (e.g., red or green), shape (e.g., square, triangle, or circle), text, icon, pattern, shade, or combinations of these. For example, a red visual indicator 827A (as shown by the filled-in circle in the figure) can indicate that usage of the reserved resource has fallen below the threshold utilization level. A green visual indicator 827B (as shown by the unfilled circle in the figure) can indicate that usage of the reserved resource is above the threshold utilization level.

The action column (column 825F) permits the IT administrator to select an action related to the reserved resource. For example, the IT administrator may select an action "Send Notification," "Reclaim," or "Apply Chargeback." The action "Send Notification" sends a notification to Tim, Tim's manager, or both to inform them that the reserved resource is being under-utilized and that they may want to consider releasing at least some portion of the reserved resource so that the resource can be made available to other users. The action "Reclaim" reclaims at least a portion of the reserved resource so that the resource can be made available to other users. The action "Apply Chargeback" can be used to apply a charge to the user's department based on the reserved resources. In a specific implementation, the central management console application communicates or passes the selected action to an external system (e.g., resource utilization and tracking) for the external system to fulfill.

Charts 822 provide a graphical summary of current resource utilization such as utilization of storage, virtual machines, or network bandwidth. Such resource utilization may be generated by resource utilization and tracking system 545 for display in the dashboard of the central management console system. As shown in FIG. 8, there can be a first chart 835A, second chart 835B, and a third chart 835C. It should be appreciated, however, that there can be any number of charts. In this example the charts are pie charts. However, there may instead or additionally be other types of charts such as bar charts, graphs (e.g., line graphs), and the like.

In this specific implementation, first chart 835A is a pie chart that summarizes utilization of storage. Chart 835A includes first and second slices 840 and 845, respectively. The first slice corresponds to the portion of total storage that is available or unreserved. The second slice corresponds to the portion of total storage that has been reserved. In this example, 60 percent of the organization's storage has been reserved and 40 percent is available (e.g., available for users to reserve). There is a visual indicator associated with the second slice or reserved slice to indicate whether or not the reserved resources are being used efficiently. For example, the second slice may be displayed using a first visual indicator to indicate that the reserved resource (e.g., storage) is being used efficiently. In the figure, the second slice is shown unfilled to indicate the first visual indicator. If the reserved resource was being used inefficiently, the second slice may be displayed using a second visual indicator, different from the first visual indicator, to indicate that the reserved resource is being used inefficiently.

As a further example, consider second chart 835B which summarizes utilization of virtual machines. A third slice 850 corresponds to the portion of total virtual machines that are available. A fourth slice 855 corresponds to the portion of virtual machines that have been reserved. In this example, the fourth slice is displayed using the second visual indicator to indicate that the reserved resource (e.g., virtual machines) are being used inefficiently. In the figure, the fourth slice is shown filled to indicate the second visual indicator. If the reserved resource was being used efficiently, the fourth slice would be displayed using the first visual indicator. Resource utilization and tracking is further described below in the discussion accompanying FIGS. 9-12 and in U.S. patent application No. 13/249,453 which is incorporated by reference along with all other references cited in this application.

Application execution map section 815 includes a user-selectable control 830 and an application execution map 835. User-selectable control 830 permits the user (e.g., IT administrator John) to select an application to map. Upon selection of the application, application execution map 837 is displayed showing the nodes or machines on which the selected application is executing.

Application execution map 837 includes icons or symbols to represent first, second, and third nodes 862A, B, and C, respectively, and first, second, and third communication links 863A, B, and C, respectively, between the nodes. The map may further include a legend 865, user controls 870, node details section 875, or combinations of these.

In this example, the nodes represent the machines that are participating in executing the application. A participating node may include a server machine that is hosting or executing a component of the application or a client machine that is communicating with the server machine.

As shown in map 837, the nodes are represented graphically as circles. It should be appreciated, however, that other icons, graphical objects, or shapes may instead be used such as squares, triangles, rectangles, stars, and so forth. Further, the map may include different icons or shapes. For example, an icon of a first type (e.g., circle) may represent a server that is hosting an application component. An icon of a second type (e.g., square), different from the first type, may represent a client computer that is making a request to the server, where the client computer does not have a monitoring agent installed. The communication links are represented as lines or bars extending from one node to another node. Displaying the communication links is optional and is not included in some embodiments.

User controls section 870 provides one or more user controls for controlling the information displayed on the application execution map. Examples of user controls include dropdown lists, filters, radio buttons, check boxes, buttons, and the like. There can be controls for zooming in and out, panning, or both. There can be a communications link toggle control that allows the user to toggle the display of the communication links, i.e., to show or hide the communication links. As a specific example, there may be a filter. The filter can be used to show or hide specific nodes. Filtering may be based on an IP address associated with a node, type of node (e.g., server node versus client node), or both.

For example, when client nodes are added to the map there could potentially be a very large number of clients. It may not be desirable to display all the clients on the map because such a display may appear very cluttered. A map containing a large number of nodes may be displayed using aggregation on some nodes, and allowing the user to expand the parts that are of interest. For example, all nodes participating in an application that live in a given data center could initially be represented as a single node on the application map, and when/if the user chooses to, expanded to show individual nodes (aggregation could be explicit by configuration for some IP address ranges or done automatically by common network address prefix, for example same first 3 bytes of an IPv4 address). Aggregation could be triggered if the application map is large enough, so that small maps are displayed node by node.

A user may select dynamically what to display or not on the map. For example, as discussed above, seeing all client nodes might or might not be of interest, so this is something that the user can easily trigger on/off or toggle. In other words, application nodes may be typed (e.g., "client" being different than "server" or "DB," etc). Some nodes may be displayed on the map even if they are not currently participating, for example a database known to be accessed by the application (even if it was not recently accessed by the application). Thus, some nodes might have a special status such as "display when not part of the application" that is configurable at the node agent level or at the application or map level.

Node details section 875 can provide details about a specific node or machine that is participating in executing the application. The details can include configuration information, operating system version, memory usage, processor usage, disk space or disk usage, or any computer parameter or combination of parameters. A detail such as memory usage may be displayed in a graphical form such as via a bar chart or pie chart.

The application execution map may be an interactive map. For example, the user may be able to select via a pointing device a particular node and the details about the particular node will be displayed in the node details section. The node details section may be implemented as a pop-up dialog box, as a window separate from the window displaying the application execution map, or as a frame within the window displaying the application execution map. Application execution mapping is further described below in the discussion accompanying FIGS. 13-22 and in U.S. patent application No. 13/245,390 which is incorporated by reference.

Sections 810 and 815 shown on dashboard 805 are merely examples of some of the information that may be included on a dashboard of the management console system. It should be appreciated that a dashboard may instead or additionally include other sections such as a notifications section. The notifications section can display a list of resource reservation requests for the IT administrator to review.

Figure 9:
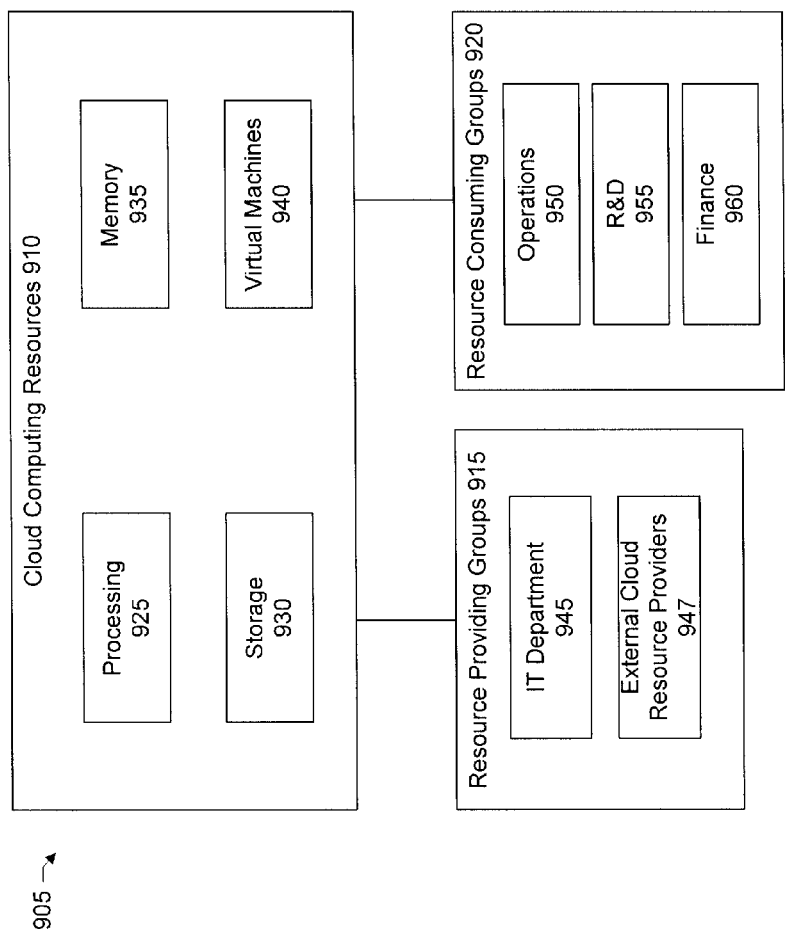
FIG. 9 shows a block diagram of cloud computing resources of an organization and the different groups that provide and use such resources.

FIG. 9 shows an environment in which system 545 as shown in FIG. 5 may be implemented. System 545 may be referred to as a rent-a-cloud service through which resource utilization and tracking is provided to central management console system 505. As shown in FIG. 9, there is an organization 905 having cloud computing resources 910. The resources are managed by one or more resource providing groups 915 and are available for use by one or more resource consuming groups 920.

Cloud computing can be used to describe a delivery model for information technology (IT) services. Cloud computing can provide network access to a shared pool of computing resources which can be hardware resources, software resources, or both. More particularly, cloud computing resources can include processing 925 (e.g., CPU processing), storage 930, memory 935, and virtual machines 940. Other examples of resources include network bandwidth, services, software, or application programs—just to name a few examples.

Physical resources such as processors, storage, and memory can be combined via virtualization software to form a virtual machine (VM). A virtual machine is a software implementation of a physical machine (i.e., a computer) that executes programs like a physical machine. A virtual machine is a software abstraction of a physical computer system that is installed as a "guest" on a "host" hardware platform. In a specific implementation, a resource represents a logical object that is capable of providing to the user some IT functions, such as computing and storage. Thus, one example of a resource is a virtual machine that can provide to the user some capabilities such as computing and storage.

In the organization, such resources are typically provided or managed by an IT department 945. The IT department may be responsible for purchasing or leasing additional resources as needed, such as from external third parties 947, configuring the resources, and providing the resources to other departments in the organization such as operations 950, research and development (R&D) 955, and finance 960.

In a specific implementation, a system and technique is provided for a self-service model through which a user in a group (e.g., R&D group) requests or applies for use of IT or cloud computing resources. Some benefits of the model include standardizing the process for requesting and authorizing IT services, improved efficiency and quality of IT services, simplified user operations, and an improved user experience. In a specific implementation, a system and technique is provided for utilization notifications and a "pay for what you use" billing feature which can reduce resource waste and save the organization money.

In various specific embodiments, there is a resource rental component that supports an authorization process and enables the end-user to rent IT resources online easily, an end-user resource utilization tracking component that crosses the elastic cloud environment, a policy-based notification component to identify a potential resource as a reclaim target, and a "pay for what you use" feature to enable IT as service charge back.

In some organizations, heavy human interaction is involved in resource applying. This can be inefficient and hard to trace. Further, there is a lack of usage tracking and reclaim policy, at the end-user level which can cause resource waste. Lack of a resource charge back policy prevents IT as a service from being realistic. In other words, a user in an organization may make a request for various computing resources (e.g., virtual machines or storage). In response to the request, the IT department may set aside those resources for the user. In some cases, however, the user may make inefficient use of those resources. For example, the user may have over estimated their use or need of the resources or have may have forgotten that they have reserved those resources.

As a specific example, if the user was allocated 50 virtual machines, but instead used only 20 virtual machines, there would be a waste of resources or 30 virtual machines (i.e., 50 virtual machines allocated−20 virtual machines used=30 virtual machines). These resources, having been allocated to the user, will be sitting idle and unused when it is possible that other users in the organization may have a need for those resources. Ultimately, the entire organization may suffer because of waste and inefficiency. The problem faced by the organization may be described as the "tragedy of the commons." The tragedy of the commons is a dilemma arising from the situation in which multiple individuals, acting independently and rationally consulting their own self-interest, will ultimately deplete a shared limited resource, even when it is clear that it is not in anyone's long-term interest for this to happen. In a specific implementation, a system and technique as described in this application helps to prevent waste of shared resources (e.g., computing resources).

Figure 10:
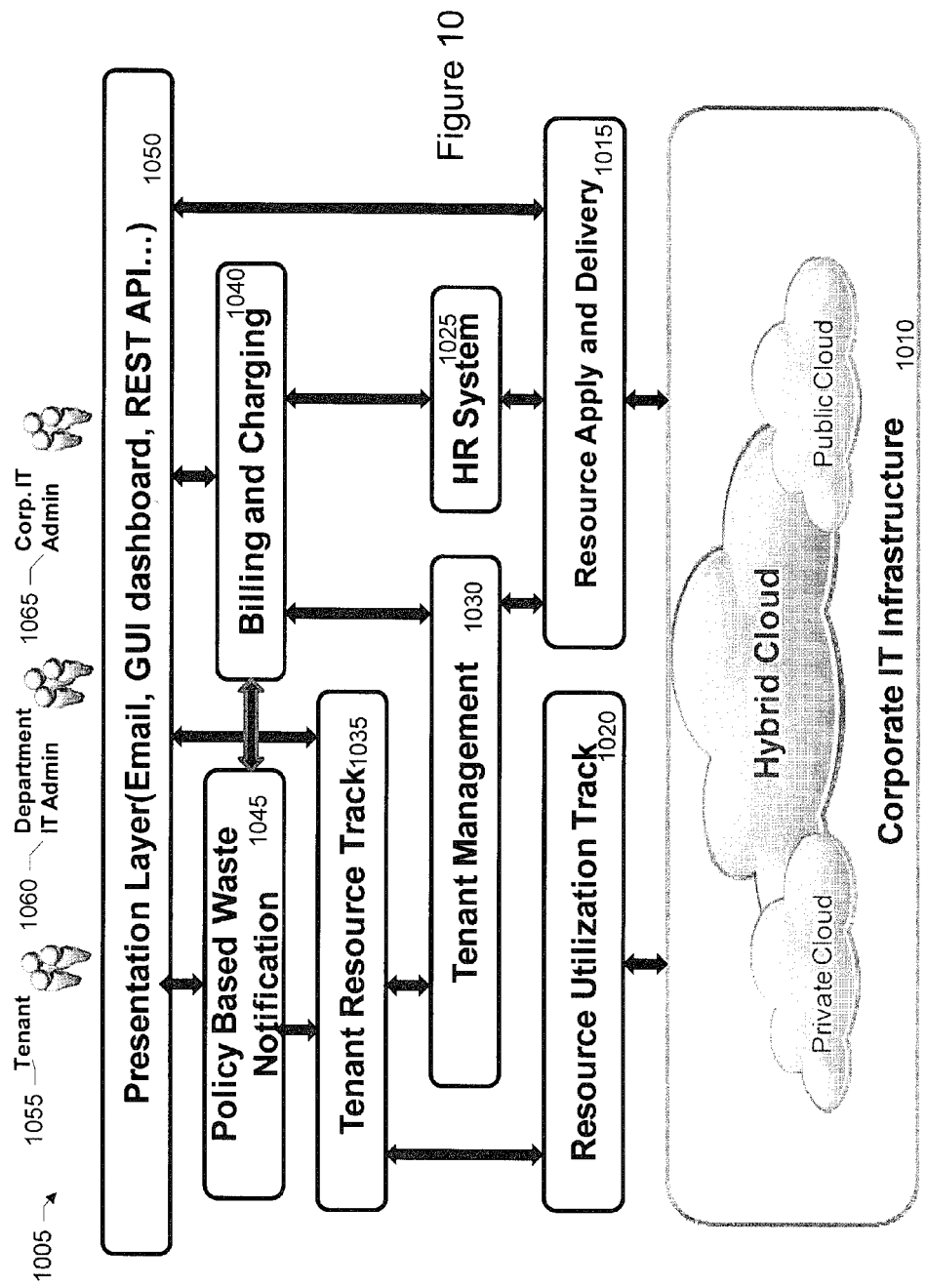
FIG. 10 shows a block diagram of components of a system for utilization tracking and notification of cloud resources.

FIG. 10 shows a block diagram of components of an IT resource rental and utilization tracking system 1005. This system may include several components, subcomponents, subsystems, or modules. In a specific implementation, the system includes an infrastructure or computing resources 1010, resource application and delivery 1015, resource utilization tracking 1020, human resources (HR) 1025, tenant management 1030, tenant resource tracking 1035, billing and charging 1040, policy-based waste notification 1045, and a presentation layer 1050 through which users, employees, managers, or groups such as tenants 1055, department IT administrators 1060, and corporate IT administrators 1065 may interact with the system. Arrows between the various components indicate communications or exchanges of information between the components. In a specific implementation, these components are internal to the utilization tracking and notification of cloud resources system. In another specific implementation, one or more of the components are external to the system. For example, the system may interface, such as via an API, with an external HR system, an external billing and charging system, and so forth.

IT infrastructure 1010 provides IT services for supporting the various users, groups, departments, or business units of an organization such as corporate operation, R&D, finance, etc. The IT system may be built on a hybrid cloud that leverages capabilities of both a private cloud and public cloud. A public cloud can refer to cloud infrastructure that is made available to the general public or a large industry group. The cloud infrastructure may be owned by an organization selling cloud services. A private cloud can refer to a cloud infrastructure that is operated solely for an organization. It may be managed by the organization or a third party and may exist on premise or off premise. A hybrid cloud may refer to a cloud infrastructure that is a composition or combination of two or more clouds (e.g., private or public) that remain unique entities but are bound together by standardized or proprietary technology that enables data and application portability (e.g., cloud bursting for load balancing between clouds). Specifically, the IT infrastructure may include computing resources such as that shown in FIG. 9 and described in the discussion above accompanying FIG. 9.

Resource application and delivery 1015 includes an IT application by which an employee can apply for IT resources (e.g., computing or cloud computing resources). The application includes a configurable authentication process or a configurable approval process workflow to authorize use of the resources. For example, a process for an employee to apply for or request a resource such as a virtual machine may include: 1) Employee initializes a resource to apply for an application. 2) The employee's manager is asked to approve. 3) The department IT administrator checks the available resources and delivers resource.

Thus, in a specific implementation, an employee requests computing resources by completing an application or request. Based on a configurable workflow approval process, the system forwards the request to the employee's manager or supervisor. For example, resource application and delivery 1015 may exchange information with HR 1025 to identify the employee's manager. Upon approval, the system forwards the request to an IT administrator. The IT administrator can use the system to check whether or not the resource is available for the employee. If the resource is available, the IT administrator can use the system to allocate the resource to the employee such as indicating that the resource has been assigned or reserved for the employee.

Resource utilization tracking 1020 collects the utilization data from the IT infrastructure (e.g., corporate IT infrastructure) for the resources. In a specific implementation, the data is used to calculate one or more utility ratios, such as a utility ratio of CPU utilization, of storage utilization, or both. In a specific implementation, resource utilization tracking 1020 can monitor usage of the allocated resource and calculate metrics to measure how efficiently the allocated resources are being used.

HR system 1025 maintains the employment hierarchy of the corporation, such as employee A belongs to department B and employee A's manager is employee C. Tenant management 1030 manages an inventory for recording the resource allocation information. By this system, people can be aware of who is occupying what resources. Tenant resource tracking 1035 provides a utilization summary of resources that were allocated to a tenant. Billing and charging 1040 may be based on a "pay for resources" charging strategy. The system can charge a tenant by the allocated resources.

Policy-based waste notification 1045 enables people (e.g., users, employees, or managers) to receive notification when there may be waste of a resource or some potential waste happened. The notification may be based on a configurable trigger policy. For example a department manager will receive an email from the system when the utility ratio of some resource is lower than a threshold in his department. The notification may show an amount of money the wasted resource cost. Presentation layer 1050 provides techniques for interacting with the end-user, for example email delivery, a GUI application, and any program interfaces.

Figure 11:
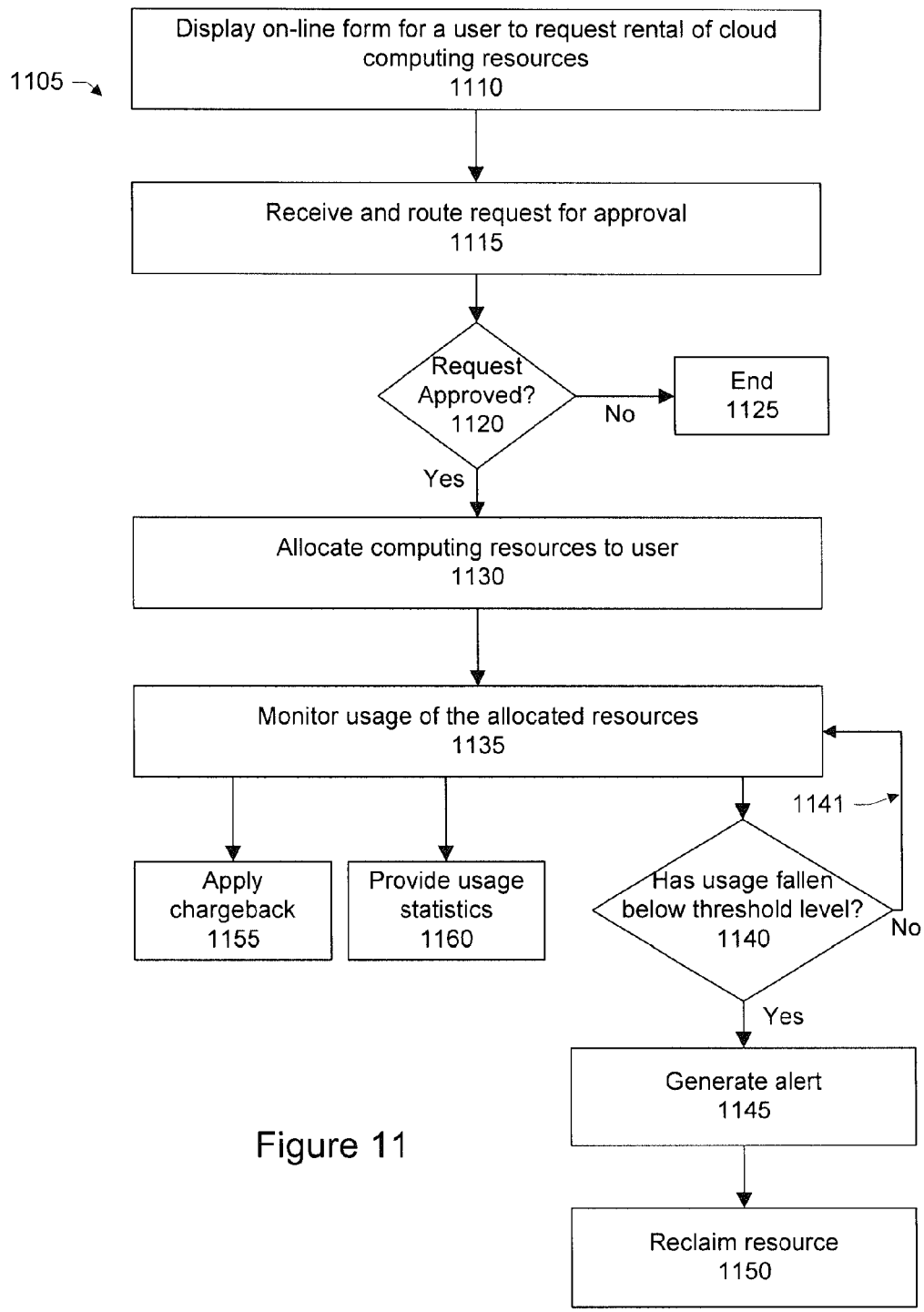
FIG. 11 shows a flow for utilization tracking and notification of cloud resources.

FIG. 11 shows an overall flow diagram 1105 for resource rental and utilization tracking. In brief, in a step 1110, the system displays an online form or Web page for a user to request rental of computing resources. The request is received and routed for approval (step 1115). If the request is approved (step 1120), computing resources are allocated to the user (step 1130). In a step 1135, the system monitors usage of the resource. In a step 1155, the system may apply a chargeback of the resources. In a step 1160, the system provides usage statistics. In a step 1140, the system determines whether usage of the resource has fallen below a threshold level. If usage has fallen below the threshold level, the system may generate an alert (step 1145), reclaim the resource (step 1150), or both.

Referring now to step 1110, an online form or Web page is displayed to the user through presentation layer 1050 (FIG. 10) of the system so that the user can make a resource request. The form may include any number of various sections and input boxes for the user to input information. There can be a header section, a resource rental detail section, and a submit button. The header section may include input boxes or fields for the user's name, contact information (e.g., phone number, or e-mail address), location (e.g., building number, or office location), department (e.g., R&D), supervisor, and so forth. Some of the information may be pre-populated. For example, there may be a login or authentication process where the user enters a username and password. Based on the username, HR system 1025 (FIG. 10) may be consulted to determine the user's department, supervisor, and so forth.

The resource detail section allows the user to specify the resources to rent. For example, there can be input fields to request a certain number of virtual machines, an amount of storage capacity, memory, processing units or time or CPU capacity or cycles, specific instances, specific configurations, bandwidth or network bandwidth (e.g., 10 Gigabit Ethernet), platform type (e.g., 32-bit versus 64-bit platform), an amount of data transfer (e.g., 1 million input and outputs), and the like.

In a specific implementation, the resource detail section includes a field to specify a time, time period, or duration during which the user expects to use the resources. For example, the user may request a reservation of 50 virtual machines for the period beginning Oct. 7, 2011 to Mar. 7, 2012; 750 gigabytes of storage for the period beginning Sep. 9, 2011 to Apr. 15, 2012; and so forth. In another specific implementation, a user is not required to specify a reservation time period or the time period may be open-ended. For example, the user may request 75 virtual machines for an indefinite period of time. It should be appreciated that the resource request form may include various GUI controls such as dropdown lists, radio buttons, text boxes, buttons, check boxes, and the like.

Upon completing the resource request form, the user can click a submit button to submit the request to the system. In step 1115, the system receives and routes the request for approval. For example, HR system 1025 may be consulted to identify the user's manager or supervisor. The system then routes the request to the user's supervisor for approval. Upon approval, the approved request may be forwarded to the IT administrator. It should be appreciated that this is merely one example of an approval process. There can be multiple levels of approval and multiple people who participate in the approval process. For example, if a large amount of resources is requested, multiple people such as directors, vice presidents, and so forth may be involved in the approval process. In an embodiment, there is a workflow builder tool that allows an administrator user to specify the approval workflow process. This allows the approval process to be user-configurable to suit the specific procedures and protocols of the organization.

In step 1130, computing resources are allocated to the user. The amount of allocated computing resources may be the same or different from what the user requested. For example, if the user requested 50 virtual machines, but the IT department is unable to provide 50 virtual machines then the user may be allocated a reduced amount of resources (e.g., 40 virtual machines). Resource application and delivery 1015 provides an interface through which an IT administrator can allocate or reserve a portion of the computing resources to the requesting user.

For example, through the central management console system (FIG. 7) the IT administrator can indicate that 50 virtual machines have been allocated to user A for a particular time period. That is, the administrator may associate the virtual machines with user A for the particular time period. The 50 virtual machines are thus indicated as having been reserved for user A for the particular time period so that they will be unavailable for other users, but available for user A. Alternatively, in another specific implementation, the system can automatically make the associations based on an approved resource rental request.

In a specific implementation, the system maintains a record, such as stored in a database, that includes an identification of the user, the portion of computing resources allocated to the user, and a time period for which the portion of computing resources have been reserved. A record may be referred to as a reservation. Table A below shows an example of such a record.

TABLE A

| User | Allocated Resources | Time Period |
|---|---|---|
| Madeleine | 60 virtual machines | Oct. 7, 2010-Apr. 1, 2011 |
| Leah | 500 gigabytes | Oct. 30, 2010-Jun. 7, 2011 |

In step 1135, the system monitors usage of the allocated resources. Such monitoring can allow the system to apply a chargeback (step 1155), provide usage statistics (step 1160), determine whether usage has fallen below a threshold level (step 1140), or combinations of these. Depending on the type of resource, monitoring may include analyzing used and available disk space or virtual machines, detecting whether or not a virtual machine has been powered on, determining a number of times a virtual machine has been powered on, detecting whether or not a datastore has been accessed, determining a number of times a datastore has been accessed, measuring the amount of outgoing bandwidth, amount of incoming bandwidth, processing time, the number of requests (e.g., HTTP and HTTPS requests), database calls, and so forth.

A chargeback (step 1155) is an accounting technique that applies the costs of computing resources (e.g., services, hardware, or software) to the business unit that requested the resources. A chargeback helps to identify which departments, individuals, or both are responsible for the expenses. This can encourage departments and individuals to make efficient use of resources and in turn can lead to greater profitability of the organization. In a specific implementation, the chargeback is based on a "pay for what you use" policy. For example, if the user used 30 virtual machines, the user (or the user's department) would be charged for 30 virtual machines.

In another specific implementation, the chargeback is based on a "pay for what you reserved" policy. In this specific implementation, the user is charged for the resources that the user reserved, even if the user did not use all of the reserved resources. For example, if the user reserved 50 virtual machines, but used 30 virtual machines, the user would be charged for the 50 virtual machines. In another specific implementation, the chargeback is based on a "pay for what you reserved, but did not use" policy. In other words, in this specific implementation, users are not charged for what they used. Rather, in this specific implementation, they are charged for what they did not use. These techniques can be used to help promote the efficient use of resources. Users are encouraged to carefully consider their resource needs because there may be consequences for unused resources. In step 1160, the system provides usage statistics such as via dashboard 805 as shown in FIG. 8. Some examples of usage statistics include amount of storage used, number of virtual machines used, and so forth.

In step 1140, the system analyzes usage of the allocated resources to determine whether usage has fallen below a threshold or resource utilization level. As shown by a loop 1141, the system may continuously monitor usage of the resource throughout the resource reservation period, continuously monitor usage of the resource throughout a portion of the resource reservation period, or make regular periodic or random checks of resource usage during the resource reservation period. If the usage has fallen below the threshold level, the system generates an alert (step 1145), reclaims the resource (step 1150), or both. Usage of a resource that falls below the threshold level may indicate that an allocated resource is not being used efficiently. Thus, the resource may be reclaimed, a portion of the resource may be reclaimed, a duration of time that the resource is reserved for may be reduced or shortened, or combinations of these so that the resource can be made available for other users.

Figure 12:
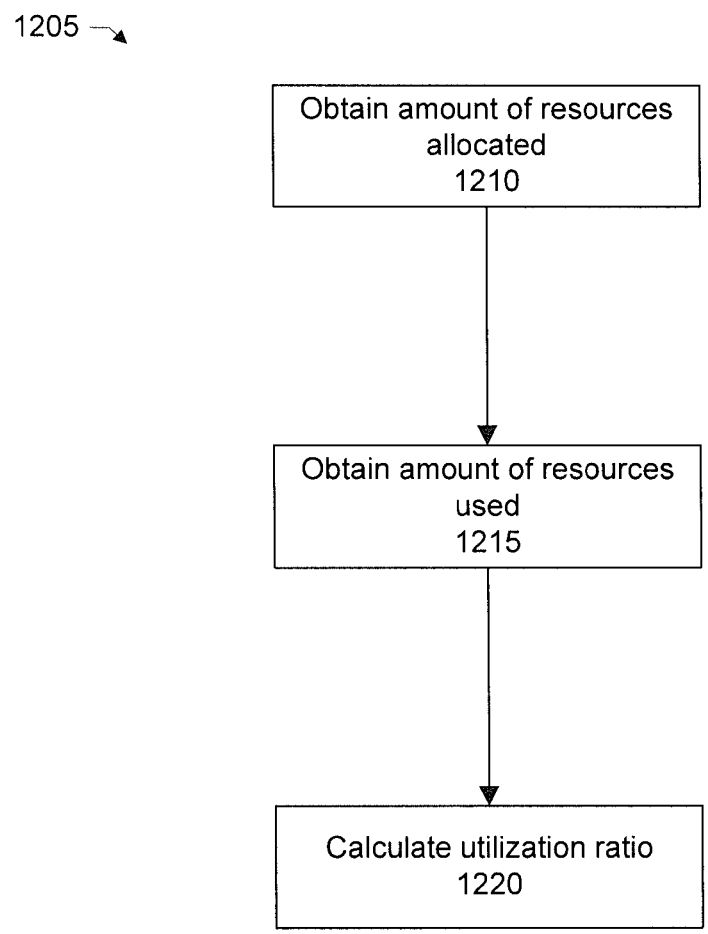
FIG. 12 shows a flow for calculating a resource utilization ratio.

In a specific embodiment, the threshold level is user-configurable. The threshold-level may be implemented as a user-configurable policy. An organization may mandate a certain level of resource utilization when resources are allocated to or reserved for use by various departments. Referring now to FIG. 12, there is a flow 1205 for calculating resource utilization. In a step 1210, the system obtains an amount of resources allocated (or reserved) for the user. In a step 1215, the system obtains an amount of resources used by the user. In a step 1220, the system calculates a ratio based on the amount of resources allocated and the amount of resources used. The ratio may be referred to as a utilization ratio. In a specific implementation, resource utilization is calculated as a ratio of resources used to resources allocated. In another specific implementation, resource utilization is calculated as a ratio of resources allocated to resources used.

It should be appreciated, however, that any computation (and not necessarily a ratio) may be used to provide an index indicating how efficiently a resource is being used. Such a computation may involve addition, subtraction, division, multiplication, or combinations of these. A computation may include values corresponding to an amount of resources allocated, an amount of resources used, an amount of resource not used, or combinations of these. A resource usage calculation may include a statistical measurement such as an average, arithmetic mean, weighted mean, median, mode, standard deviation, range, or combinations of these.

For example, an organization may have a policy of 80 percent resource utilization. If a user reserves 500 gigabytes of storage, but uses only 250 gigabytes, this would result in a utilization ratio of 50 percent (i.e., 250 gigabytes:500 gigabytes=50 percent). Thus, in this example, the system would determine that usage of the allocated resources has fallen below the threshold level of 80 percent. As another example, a user reserves 100 virtual machines, but uses only 70 virtual machines, this would result in a utilization ratio of 70 percent (i.e., 70 virtual machines:100 virtual machines=70 percent).

Depending upon the resource being measured, there can be different threshold levels. This allows the organization flexibility in setting resource utilization policy requirements depending on the type resource. Usage of a first resource type may be measured against a first threshold. Usage of a second resource type, different from the first resource type, may be measured against a second threshold. The first and second thresholds may be the same or different.

For example, the first resource type may be storage and the organization may set a policy that there be 80 percent utilization of allocated storage. The second resource type may be virtual machines and the organization may set a policy that there be 70 percent utilization of allocated virtual machines. Having different utilization thresholds based on resource type can reflect the different costs of different resource types. For example, if a first type of resource is more expensive than a second type of resource, the organization may impose a higher utilization requirement for the first type of resource than the second type of resource to reflect the added costs of the more expensive resource (i.e., first type of resource). This can help encourage users to be especially aware and carefully estimate their needs when reserving a specific type of resource.

In a specific implementation, the system determines whether resource utilization is under a threshold for a period of time, and if so, generates an alert. In a specific implementation, there is a sampling time period that overlaps with a resource reservation time period or a time period during which the allocated resource is intended to be used. During the sampling time period, the system periodically samples or calculates a set of usage values indicating usage of the resource. For example, a first usage value indicates usage of the resource at a first time during the sampling time period. A second usage value indicates usage of the resource at a second time during the sampling time period. A third usage value indicates usage of the resource at a third time during the sampling time period, and so forth. The sampling may be performed randomly or at regular times. In this specific implementation, if a number of times a usage value falls below a threshold value exceeds a threshold number of times, the system generates an alert. The sampling time period may be a rolling time period. In this specific implementation, an alert is generated if a usage value falls below a threshold usage value more than a threshold number of times in a rolling time period.

In a specific implementation, the system makes a prediction of the amount of resources expected to be used, and compares the prediction with the allocated amount of resources or a percentage of the allocated amount. If the prediction is less than the allocated amount or less than a percentage of the allocated amount, the system generates an alert. The prediction may be based on factors such as a resource usage rate. For example, if based on a current resource usage rate the user is unlikely to use all of their allocated resource, the amount of allocated resource may be reduced, a time period for which the resource has been reserved may be reduced, or both. A prediction may instead or additionally be based on a user profile history indicating whether or not the user tends to over or under estimate their use of resources. Thus, in a specific implementation, threshold levels may be user-based or calculated dynamically to account for differences in how individual users tend to estimate their use of resources. A prediction may be calculated using inferential statistics and may include hypothesis testing, estimation, correlation, extrapolation, interpolation, modeling (e.g., regression analysis), or combinations of these.

In step 1145, the system may generate an alert or notification to indicate that usage has fallen below a threshold level. The alert may include an e-mail, text message, phone call, instant message, dashboard notification, or combinations of these. In a specific implementation, the system transmits the alert to the user's manager or department manager. However, the workflow for sending an alert can be configurable so that an alert may instead or additionally be sent to the user, an IT administrator, or both. In a specific implementation, the alert is not generated if usage is above the threshold level. Not generating the alert can help to prevent, for example, the IT administrator from becoming bombarded with notifications. Alternatively, in another specific implementation, the alert is generated if usage is above the threshold level. Generating such an alert can provide confirmation that the resource is being efficiently used.

In a specific implementation, the alert includes an indication of the amount of money the wasted resource cost. Such an alert helps to encourage efficient use of a resource. An alert may include a currency amount (e.g., a dollar figure) representing the difference between a first value corresponding to an amount associated with complete use of the resource and a second value corresponding to an amount associated with actual or predicted use of the resource. An alert may instead or additionally include the utilization ratio.

In a specific implementation, an alert is transmitted to the user for which the resources were reserved. In this specific implementation, the alert includes a question asking whether or not the user still needs the resource. The user may be able indicate their response to the question and transmit the response back to the system. Based on the response, the system may or may not reclaim the resource or a portion of the resource. For example, if the user indicates they still need the resource, the system may not reclaim the resource. If the user indicates they no longer need the resource, the system may reclaim the resource.

In various implementations discussed above, the system determines whether usage falls below a threshold level such as whether usage is less than the threshold level, or less than or equal to the threshold level. In other specific implementations, however, the system may determine whether lack of usage or non-usage rises above a threshold level. When lack of usage or non-usage rises above the threshold level, the system may send an alert, reclaim the resource, or both.

In step 1150, a resource that is being inefficiently used may be reclaimed so that the resource can be made available for other users. For example, a virtual machine that has not been powered-on for several weeks may be reclaimed so that the virtual machine can be made available for another user. As another example, a datastore where only 10 percent is being used may be reclaimed so that the datastore or a portion of the datastore can be made available for another user.

In a specific implementation, reclaiming a resource includes reducing an amount of a resource allocated or reserved to a user. In a specific implementation, the resource is reduced to an amount equal or about equal to a threshold utilization ratio. Consider, as an example, that an organization has a policy specifying a threshold utilization ratio of 80 percent for virtual machines (VMs), a user is allocated 60 VMs, but the user uses only 20 VMs. Thus, 40 VMs are unused (i.e., 60 VMs allocated−20 VMs used=40 VMs unused). For example, the system may determine that each of the 40 VMs may not have been powered on during a time period in which the machines were intended to be used by the user (e.g., marked as reserved for the user). Thus, the actual or the user's utilization ratio is about 33 percent (i.e., 20 VMs used:60 VMs allocated=33 percent). In this example, the number of VMs allocated to the user would be reduced to 48 (i.e., 48 VMs:60 VMs=80 percent utilization ratio). Thus, 12 VMs (i.e., 60 VMs−48 VMs=12 VMs) may be freed up or otherwise made available for other users.

In other words, there can be a first amount of a resource allocated to a user. A determination is made that the resource is being inefficiently used (e.g., usage has fallen below a threshold level—step 1140). A method may include reducing the first amount of the resource to a second amount, less than the first amount. In a specific implementation, the second amount corresponds to the threshold level. As another example, a resource may include virtual machines where U virtual machines have been allocated to the user. The system can determine that V virtual machines are not being used. For example, each of the V virtual machines may not have been powered on during a time period in which the virtual machines were intended to be used by the user (e.g., marked as reserved for the user). Thus, Y virtual machines are being used (Y=U−V). In a specific implementation, the number of VMs allocated to the user is reduced to a number W. In a specific implementation, W is a number greater than Y and less than U. In another specific implementation, W is equal to Y.

As another example, a resource may include storage where 500 gigabytes have been allocated to a user, but the user is using only 100 gigabytes of storage. Thus, the user's utilization ratio is 20 percent (i.e., 100 gigabytes:500 gigabytes=20 percent). A policy of the organization specifies a threshold utilization ratio of 70 percent for storage. The amount of storage allocated to the user may be reduced to 350 gigabytes to achieve 70 percent utilization (i.e., 70 percent*500 gigabytes=350 gigabytes). Thus, 150 gigabytes (i.e., 500 gigabytes−350 gigabytes=150 gigabytes) may be freed up or otherwise made available for other users.

More particularly, when a resource is reclaimed, the system can update the stored resource reservation records to indicate the new resource allocations. Table B below shows an example of a resource reservation record from Table A having been updated as a result of reclaiming a resource.

TABLE B

| User | Allocated Resources | Time Period |
|---|---|---|
| Madeleine | 48 virtual machines | Oct. 7, 2010-Apr. 1, 2011 |
| Leah | 350 gigabytes | Oct. 30, 2010-Jun. 7, 2011 |

In another specific implementation, reclaiming a resource includes reducing an amount of time for which the resource has been allocated to a user. For example, a resource may have been allocated to a user for the user to use during a first time period. The system determines that usage of the resource has fallen below a threshold level. A duration of the first time period is reduced to a second time period. That is, a duration of the second time period is less than a duration of the first time period. An ending date of the second time period is before an ending date of the first time period. Upon expiration of the second time period, the resource is made available for other users. In another specific implementation, reclaiming a resource includes reducing an amount of time for which the resource has been allocated to a user, and reducing an amount of the resource allocated to the user.

In a specific implementation, an IT resource rental and tracking system is provided for handling resource requests in a standard and automatic way and tracking the resource utilization for intelligent data analysis. In this specific implementation, the system components include (1) process management of IT resource application authorization; (2) an automatic IT resource delivery component; (3) an IT resource utilization dashboard; and (4) a notification system.

For (1), an authorization process may include (a) Employee fills out an application online. Through the online application, the employee may specify details such as resource, rental period, and so forth; (b) Department manager approves; (c) Lab manager approves. For (2), the system can automatically assign a proper IT resource based on the employee's resource requirements. For (3), via this dashboard, the IT administrator can have a clear overview about how many resources are occupied by a user, department, or business unit as well as resource utilization. For (4), when a rental is near to close (i.e., a rental period is about to begin), the system can notify the renter (e.g., employee), administrator, or both. When the system finds that a resource utilization is under a threshold for a period of time, the system can notify the administer, employee, or both. A notification to the employee may include a question to ask the employee whether or not he or she still needs the resource.

Some benefits of the rent-a-cloud service can include (1) Providing a standard and automatic process to address resource requests. Simplifying operations for the resource requester and IT administrator and making resource tracking possible; (2) Reducing waste and saving investment of IT infrastructure; and (3) Providing a pay for utilization solution to enable IT as a service charge system in a company's private cloud environment.

In a specific embodiment, there is a focus on resource utilization tracking from tenant's point of view. That is, resources can be associated with people. For example, in some cases an IT administrator of a department may know the current status of resources allocated to his department, but he may not know the current status of resources allocated to a tenant of department. By generating a utilization report periodically, this solution gives users a chance to reevaluate their real IT needs.

In a specific embodiment, a feature includes potential waste identification. Through this policy-based notification, people can identify the potential resource waste easier. For example, there may be many IT resources are "sleeping" or not being efficiently used on the user side. However, the IT department may not be aware of such inefficient use and may purchase additional IT equipments. Through the notification, the tenant, IT department, or both can release the over-applied resource and reduce IT cost promptly. Further, corporate IT administrators can identify the potential waste, then take some necessary actions.

In another specific embodiment, a feature provides cost awareness. This solution helps the user keep in mind that IT resources are not without cost. The user, or the user's department, has to pay for what they applied. By doing this, the user will be encouraged to use the IT resource very carefully and use what they actually need. In this specific embodiment, the user is shown the cost when user applies for a resource, for example, $10=Gold VM/month. Cost may be shown on a periodically generated report, for example, the department spent $1000 for 50 VMs and 1 terabyte (TB) of storage this month. The unnecessary cost may be shown on the notification, for example, the utility ratio of a Gold VM is only 20 percent, so that department wasted $8 per month. By showing the number on a report, notification, or both people may have a direct feel about the cost they spent on a resource.

Although a specific embodiment of the system is directed to cloud computing resources or the information technology industry generally, the system is also applicable to any type of shared resource where it is desirable to help prevent resource waste. Aspects of the system may be applied to healthcare, manufacturing, financial services, government, and many others.

Figure 13:
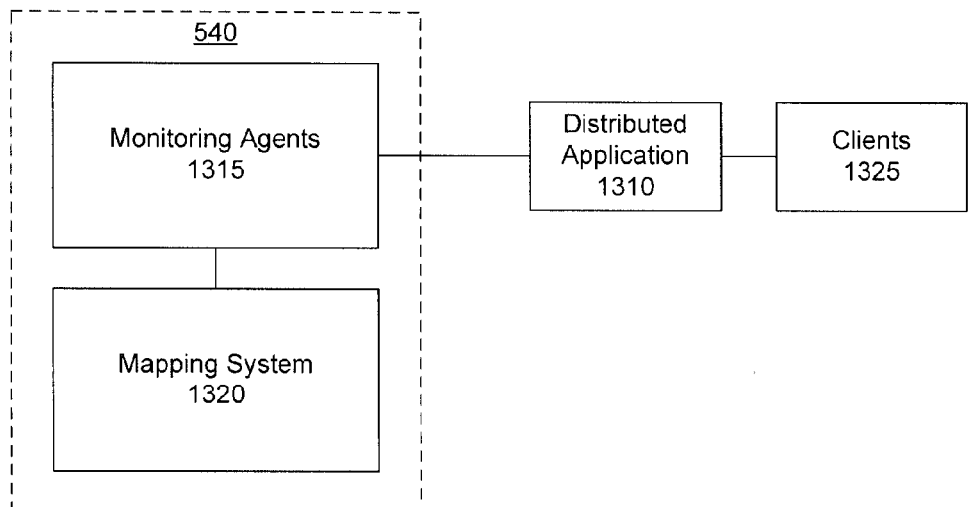
FIG. 13 shows a block diagram of an application execution mapping system including monitoring agents to monitor application execution.

FIGS. 13-19 show various embodiments for providing an application execution map to central management console system 505 (FIG. 5). More particularly, FIG. 13 shows a simplified block diagram of system 540 for mapping the execution of an application such as a distributed application 1310. This system includes monitoring agents 1315 and a mapping system 1320. The monitoring agents monitor the distributed application and transmit the monitored data to the mapping system. The mapping system builds and displays a map showing the computing nodes that are participating in executing the application.

Generally, a modern application uses or is composed of web applications, specialized servers, databases, content servers, and so forth running on multiple physical machines, virtual machines, or both distributed across one or more data centers or in private or public clouds. Clients 1325 connecting to the application may use yet another potentially large set of machines that may de facto participate in the application or execution of the application. An example of a distributed application is EMC Documentum provided by EMC Corporation of Hopkinton, Mass.

For example, typically, a distributed application utilizes the resources of multiple machines or at least multiple process spaces, by separating the application functionality into groups of tasks that can be deployed in a wide variety of configurations. In some cases, a distributed application is divided up into three or more tiers. Components in each of these perform a specific type of processing. In a 3-tier or N-tier application, there can be a user services (presentation) tier, a business services tier, and a data services tier. Each tier may include multiple computing systems for scaling and a server load balancer may be used to balance the load across the multiple computing systems.

A feature of the invention provides a dynamic execution map of an application or distributed application. The map may include the participating machines (be they local or in the cloud), the communication links between the machines, other information (e.g., communication volumes and profile, machine load, etc.), or combinations of these. In a specific implementation, the map is updated in "real time" or near real-time as machines come and go. Given that dynamism is at the foundation of cloud computing, it is generally not possible to statically provide such a map.

Having such a map has many benefits including: 1) General understanding of how an application executes; 2) Ability to understand performance limitations or bottlenecks of the application; 3) Easily spot possible application configuration mistakes; 4) Identify the impact an application modification or downtime could have; 5) Help in application debug (during development or after deployment); 6) Help with security by knowing how the application accesses resources and how it is accessed, and many other benefits.

Figure 14:
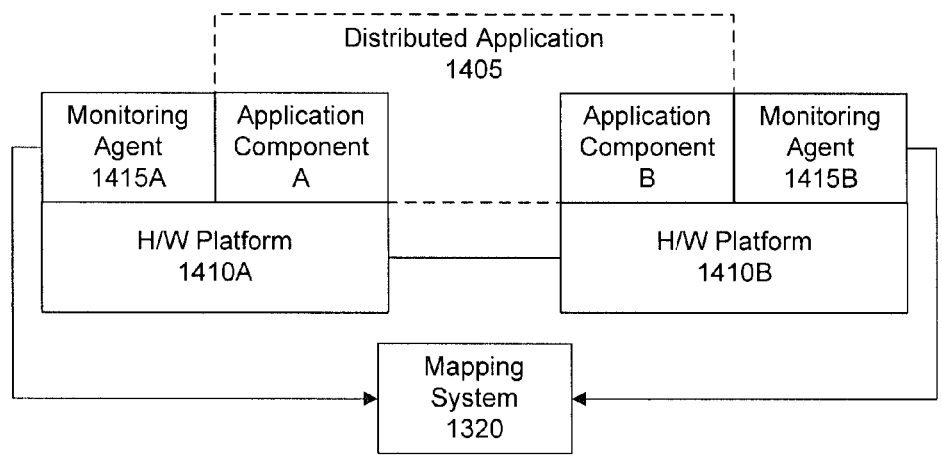
FIG. 14 shows a block diagram of a first configuration of the monitoring agents.
Figure 15:
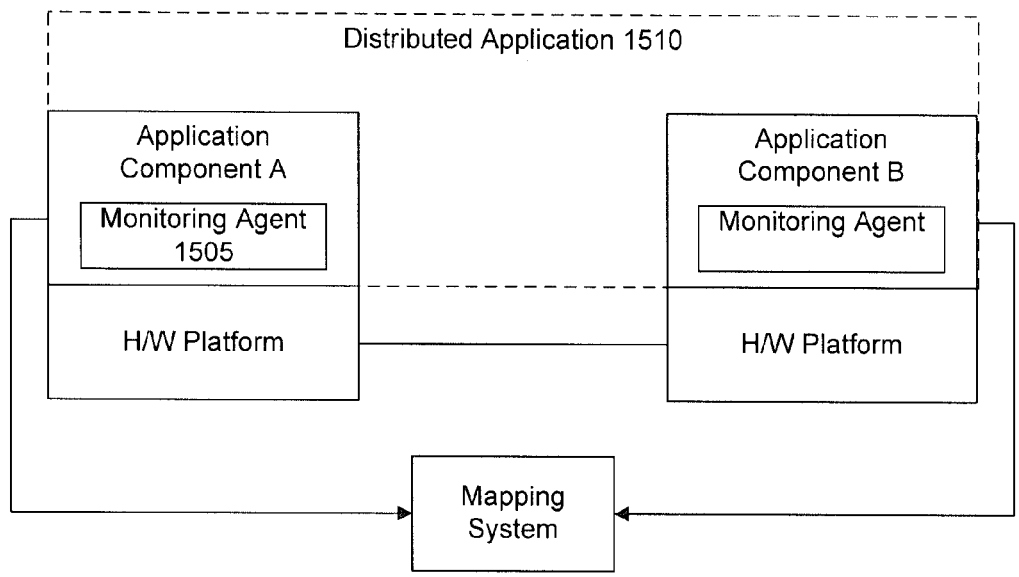
FIG. 15 shows a block diagram of a second configuration of the monitoring agents.
Figure 16:
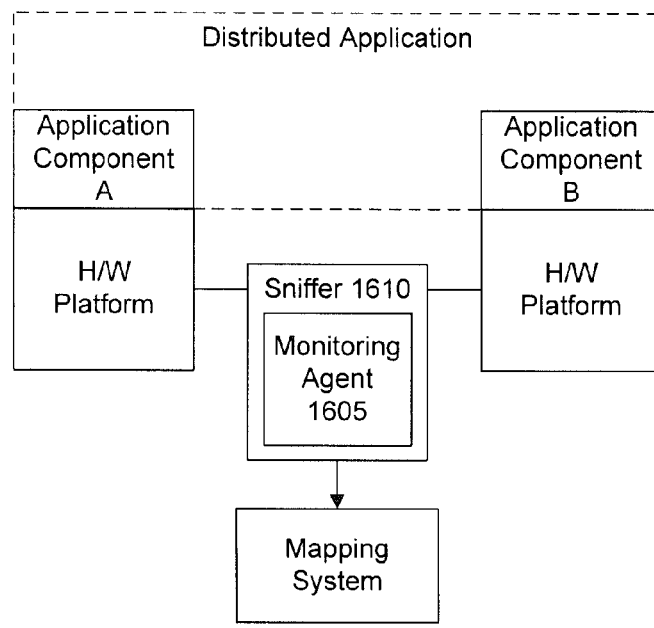
FIG. 16 shows a block diagram of a third configuration of the monitoring agents.

There can be several different types of configurations for the monitoring agents. In a specific implementation, a monitoring agent is deployed, loaded, or installed onto a computing machine (e.g., server) which executes a component of the distributed application (FIG. 14). In another specific implementation, a monitoring agent is embodied as a code module that is integrated with the distributed application (FIG. 15). In another specific implementation, a monitoring agent is implemented as a sniffer or network sniffer (FIG. 16).

For example, FIG. 14 shows a block diagram of a specific implementation where monitoring agents are programs on servers on which various components of a distributed application 1405 may be executing. In this example, the distributed application includes application components A and B executing on hardware platforms 1410A and 1410B. A network connects the hardware platforms. A monitoring agent 1415A on hardware platform 1410A monitors the execution of application component A and reports or transmits information about the execution to mapping system 1320. Likewise, a monitoring agent 1415B on hardware platform 1410B monitors the execution of application component B and reports or transmits information about the execution to mapping system 1320. The mapping system aggregates the reported information to build and display an application execution map on dashboard 805 as discussed in this application.

In this specific implementation, the monitoring agents are programs that are separate from the distributed application. For example, the distributed application may execute independently of the monitoring agents. The monitoring agents may be loaded into memory of the hardware platform before the distributed application is executed on the hardware platform. Alternatively, the monitoring agents may be installed after the distributed application is executing so that the execution can then be monitored.

FIG. 15 shows a block diagram of another specific implementation where a monitoring agent 1505 is implemented as a piece of code that is integrated with a distributed application 1510. That is, the monitoring agent is implemented as an integrated application module or code module within the distributed application. This configuration of the monitoring agent may be referred to as application instrumentation. The monitoring agent can be executing (integrated into the application) on each node on which the application is running. This monitoring infrastructure (the agents in cooperation with the mapping system) can be used to aggregate general application activity.

In this specific implementation, the application through the monitoring agent is designed to report on its execution state. For example, the application may include an application programming interface (API) which a monitoring service at a remote server can communicate with to determine whether or not the application is executing and where the application is executing. That is, the application may be written with a piece of code or code module to help monitor what the application is doing and report that information.

In this specific implementation, as shown in FIG. 15, there is one agent per application node. In another specific implementation, there can be a single abstract monitoring agent, where it is the application's responsibility to aggregate application data and pass it to the monitoring agent. That is, the monitoring agent could be abstractly used by the application and report global information about the application. However, having one agent per application node may be simpler for the application developer to integrate.

FIG. 16 shows a block diagram of another specific implementation where a monitoring agent 1605 is implemented as or within a sniffer or network sniffer 1610. The sniffer may be used for detecting communication links. A sniffer may be implemented as hardware, software, or a combination of hardware and software. The sniffer can analyze traffic flowing into and out of a computer system. As data streams flow across the network, the sniffer can capture each packet and decode the packet's raw data to determine the values of various fields in the packet. The sniffer can report on network activities related to the application being monitored.

It should be appreciated that the monitoring agent configurations shown in FIGS. 14-16 may be implemented in any combination. For example, in various specific embodiments, monitoring agents are configured as shown in FIGS. 14 and 15. Monitoring agents are configured as shown in FIGS. 14 and 16. Monitoring agents are configured as shown in FIGS. 15 and 16.

Figure 17:
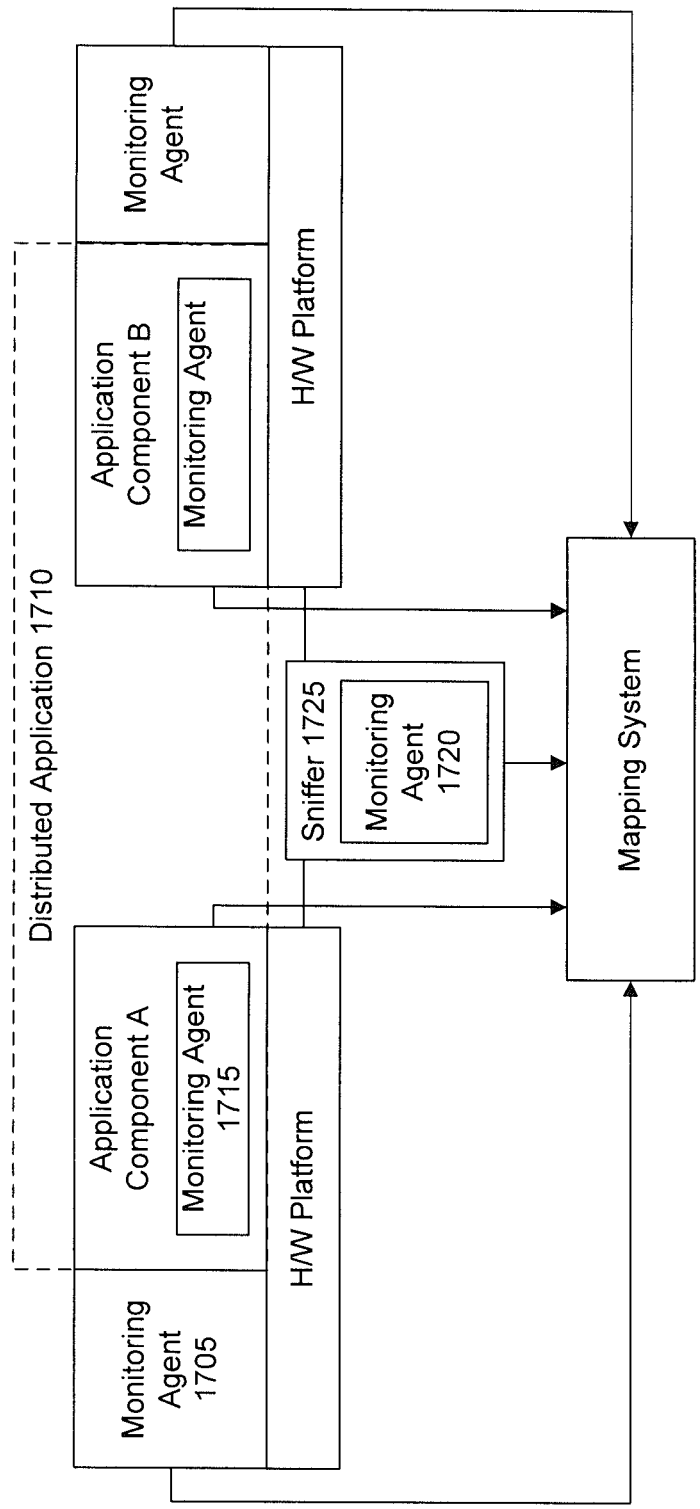
FIG. 17 shows a block diagram of a fourth configuration of the monitoring agents.

FIG. 17 shows a block diagram of another specific implementation of a monitoring agent configuration. In this specific implementation, a monitoring agent 1705 is configured as an application program that is separate from a distributed application 1710. A monitoring agent 1715 is configured as integrated with the distributed application. And, a monitoring agent 1720 is configured as a sniffer 1725.

The various monitoring agent configurations shown in FIGS. 14-17 and discussed above are designed to address the different scenarios or environments in which a system for building an application execution map may be implemented. Generally, application instrumentation is desirable to monitor an application when the application code is controlled, as the instrumentation will work in most or all environments (no requirements from the hosting infrastructure). Application instrumentation, however, may be difficult if the application is provided by a third party and does not include provisions for instrumentation (e.g., legacy code).

Network sniffing or a separate monitoring agent installed on a machine can be provided on an execution environment (for example by a cloud provider) without having to impose any constraint on the executing applications. Network sniffing, however, may be difficult on non-diffusion networks. For example a node in a virtual private network (VPN) usually cannot see the network traffic of other nodes, while a node on an Ethernet cable can see the traffic of the neighbors. Network sniffing may be difficult if there are insufficient access rights on a machine which may prevent the sniffer or monitoring agent from looking at network activity of other nodes. In some environments or separate running processes, it may be difficult to install a monitoring agent as a separate program on a machine.

Thus, there can be mixed scenarios or monitoring agent configurations depending on the environment. Consider the example of a web server calling a business tier application. The application might have been instrumented, but the web server not, and a network sniffer on the web server machine could provide additional information (such as the identity of clients connecting to the web server that then connects to the application).

Figure 18:
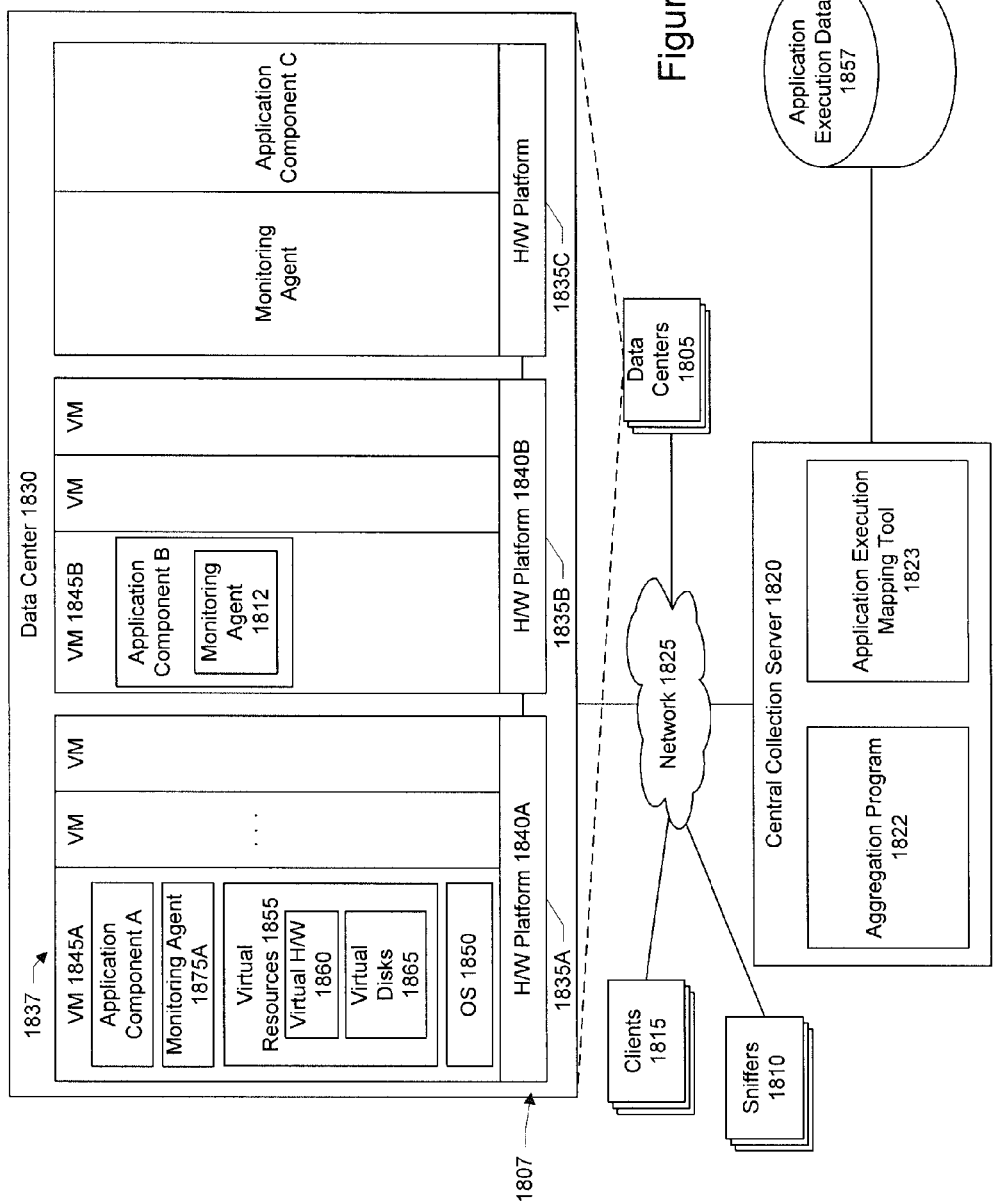
FIG. 18 shows a more detailed block diagram of the application execution mapping system.

FIG. 18 shows a more detailed block diagram of application execution mapping system 540 shown in FIGS. 5 and 13. In the example of FIG. 18 there are a set of data centers 1805 having network computing systems 1807 on which a distributed application may be executed. There can be monitoring agents configured as an application program separate from the distributed application (e.g., monitoring agent 1875A), configured as network sniffers 1810, configured as integrated code modules 1812 with the distributed application, or combinations of these. There may be clients 1815 and a central collection server 1820. The central collection server includes an aggregation program 1822 and an application execution mapping tool 1823 of the mapping system. A database 1857 for storing application execution data collected by the various monitoring agents is coupled to the central collection server. A network 1825 is coupled between the data centers, clients, and central collection server.

A data center is a facility used to house computer systems. A data center can occupy one room of a building, one or more floors, or an entire building. A data center may be remote from another data center. For example, a distance between two data centers may range from about several hundred meters to many thousands of kilometers. A data center, such as a data center 1830, may include any number of network computer systems such as servers which are typically mounted in rack cabinets. In the example shown in FIG. 18, data center 1830 includes network computer systems 1835A-C.

The computer system, such as computer system 1835A, includes a physical hardware platform 1840A having one or more components such as that shown in FIGS. 2-3. For example, the hardware platform may include a user interface, one or more processors, a network interface, mass storage, and memory. Alternatively, some embodiments may not include the user interface or the user interface may not be connected directly to the hardware platform. For example, user interaction may be automated or occur remotely.

A computer system may (or may not) be configured with a set of virtual machines 1837. In this example, computer system 1835A includes a virtual machine 1845A which provides an environment for hosting applications. The virtual machine can include a guest operating system 1850, guest applications running on the guest operating system, and virtual resources 1855 including virtual hardware 1860 and virtual disks 1865. The virtual resources refer to the resources allocated to the virtual machine and are mapped to the hardware platform. The virtual resources may further include virtual processors, virtual system memory, and various virtual devices.

More particularly, a distributed application may include any number of application components such as first, second, and third application components A, B, and C, respectively. In this example, first application component A of the distributed application is executing on machine or virtual machine 1845A. Second application component B is executing on a different machine or virtual machine 1845B. Third application component C is executing on a machine 1835C that does not include a virtual machine. The application components may be executing simultaneously or concurrently on the respective machines. A physical or virtual machine that is executing an application or component of an application may be referred to as a participating machine or node.

In the example shown in FIG. 18, virtual machines 1845A and 1845B, and physical machine 1835C on which the first, second, and third application components are executing, respectively, are on separate computer systems in the same data center. It should be appreciated, however, that FIG. 18 is merely one example of how a distributed application may be executing. Components, portions, modules, subsystems, processes, or parts of a distributed application may be executing on different virtual machines on the same computing system or hardware platform, different physical machines in the same or different data center, and so forth. One component of a distributed application may be executing on a virtual machine and another component of the distributed application may be executing on a physical machine or not within a virtual machine. One component of a distributed application may be executing within one data center and another component of the distributed application may be executing within another data center, remote from the one data center.

One or more clients 1815 may be connected to the one or more machines which are executing the distributed application. For example, a client may be sending requests (e.g., HTTP requests) for content and presenting the responses provided by the application system to a user. Such a client machine may also be referred to as a participating node.

In a specific implementation, a dynamic execution map is built using information collected from network sniffers or network sniffing for detecting communication links (one sniffer per shared medium may be sufficient), a network monitoring agent on participating machines, application programming interface (API) and explicit application integration, log monitoring and data extraction, and the like, or combinations of these. For example, a specific embodiment may include monitoring agents, network sniffers, and application code modules inserted into the application to monitor application execution. Another specific embodiment may include monitoring agents, but not network sniffers, application code modules, or both. Another specific embodiment may include network sniffers, but not monitoring agents, application code modules, or both. Another specific embodiment may include application code modules, but not monitoring agents, network sniffers, or both.

It should be appreciated that it is not necessary for all machines to be instrumented. For example, a server receiving a connection from a client can have the client added to the application map. The client is not impacted. There can be an information collection mechanism to centralize the collected raw data. In a specific implementation, the mechanism is implemented through a distributed logging framework.

A monitoring agent 1875A can be distributed and installed on computer system 1835A to detect when an application or a component of the application is executing. In a specific implementation, as shown in FIG. 18, virtual machine 1845A has been provisioned with monitoring agent 1875A. In another specific implementation, computer system 1835A is provisioned with a single instance of the monitoring agent where the agent is outside of the VM. The monitoring agent can identify on which virtual machine of computer system 1835A that application component A is executing. Because such an agent is outside the VM, the agent may be collecting information similar to that of the sniffing monitoring agent such as network traffic. Instead or additionally, through an API or other collaboration with the VM vendor, the monitoring agent may discover application execution activities within the VM.

The monitoring agent may run as a background application or process. The monitoring agent may use any technique or combination of techniques to detect when an application is executing. For example, the monitoring agent may monitor log directories expected to be used by the application when the application is executing, check if a process having a name of the application executable is running, check the output of the operating system's tasklist to see if it contains the application process name, and so forth.

The example of FIG. 18 further shows a monitoring agent 1812 configured as a code module that is integrated with the distributed application, and a monitoring agent embodied as a network sniffer.

In this specific implementation, mapping system 1320 (FIG. 13) includes collection server 1820, aggregation program 1822, mapping tool 1823, and a database 1857 to store data about application execution. Aggregation program 1822 at central collection server 1820 is responsible for aggregating the application execution data collected from the monitoring agents (e.g., monitoring agent programs, sniffers, and application code modules integrated with the application). The collected application data may be stored in database 1857. Database 1857 may be a disk based database or an in memory database. An in memory database may be better suited to changing dynamic data.

Application execution mapping tool 1823 retrieves the application data stored in the monitoring database and uses the information to build a map for management dashboard 805 that shows machines or nodes that are participating in executing the application. In a specific implementation, the map includes the communication links between the nodes, additional information (e.g., communication volumes and profile, machine load, etc.), or both. FIGS. 8 and 20-22 show some examples of application execution maps that may be created by the application execution mapping tool to show nodes or the location of nodes that are participating in execution of the distributed application.

Figure 19:
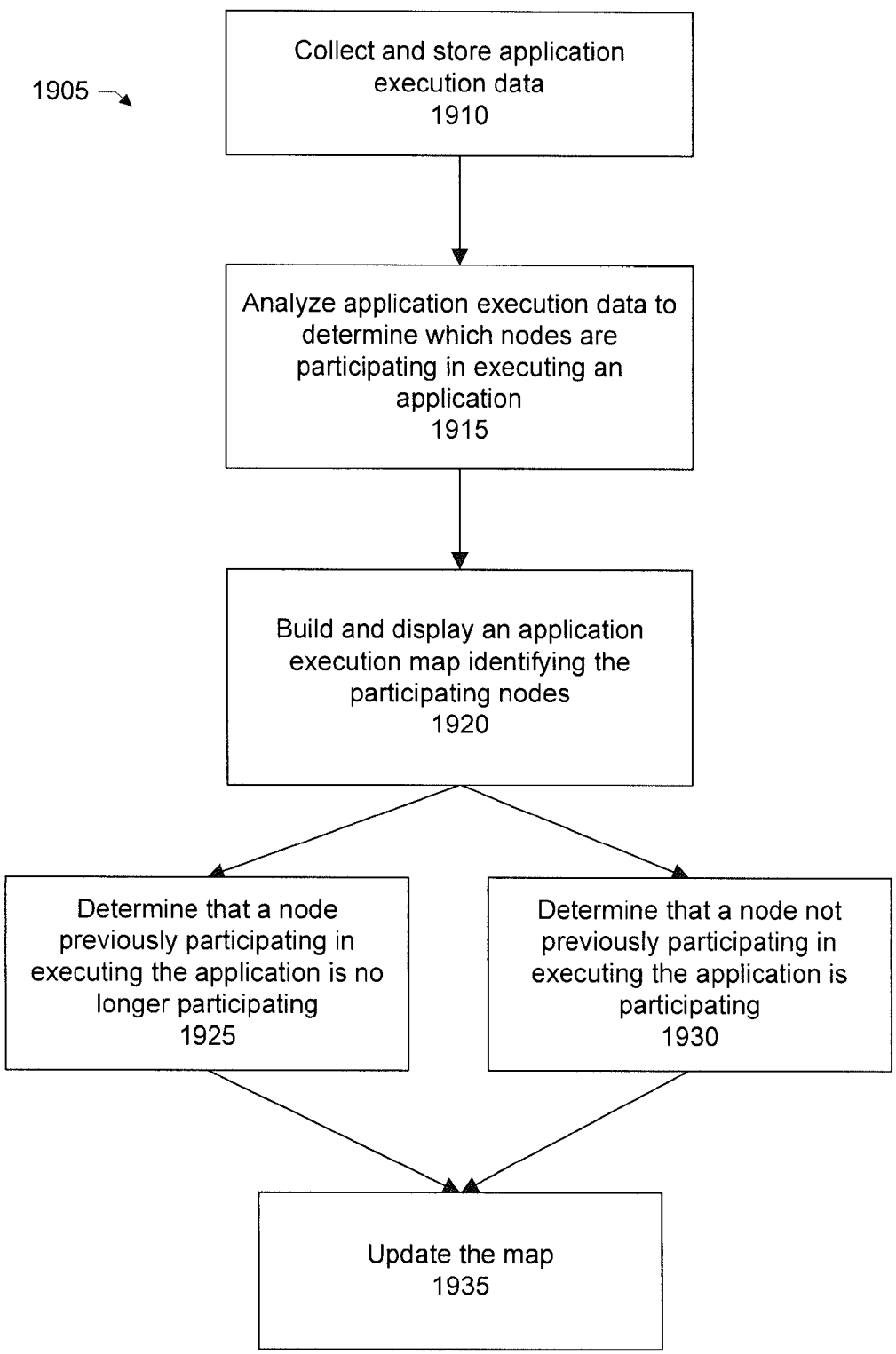
FIG. 19 shows a flow for building an application execution map.

FIG. 19 shows an overall flow diagram 1905 for building an application execution map for dashboard 805. In brief, in a step 1910, application execution data identifying or indicating nodes participating in executing the application is collected from the various monitoring agents and stored. In a step 1915, the application execution mapping tool analyzes the stored application execution data to determine which nodes are participating in execution of the application. In a step 1920, the tool builds and displays a map showing the participating nodes. In steps 1925 and 1930, the tool may determine that a node previously participating in executing the application is no longer participating in executing the application, determine that a new node or a node not previously participating in executing the application is now participating in executing the application, or both. In a step 1935, based on the determination, the tool updates the map.

In a specific implementation, the monitoring agents (e.g., monitoring agent programs, sniffers or integrated application modules) are explicitly told what they monitor (e.g., what is the application they are looking at, in addition of what to monitor on the system) and they can serve as "anchors" for the map. In other words, in a specific implementation, a monitoring agent receives a first instruction and a second instruction. The first instruction identifies one or more specific applications to be monitored. The second instruction identifies events, processes, or operations related to the specific application that should be monitored.

For example, referring to FIG. 18, there can be monitoring agents 1875A, 1810 (sniffers), an explicit code fragment 1812 included as part of the application, or combinations of these that are each told that they are monitoring a specific application (a single or different applications). Then, using the data sent back to the collection server 1820 by these specifically configured and other agents, a map or multiple maps can be built by following all the links detected by the various agents and creating a graph of participating nodes. In a specific implementation, a transitive closure is used to create the map. Care is taken to not merge all applications into a single big application if a shared resource such as a database system is used by multiple applications. The graph is assigned to be the execution graph of the application or applications that are explicitly configured for some of the agents. For example, if the transitive closure contains somewhere an explicit sniffer configuration for application A, then it is a map for application A. If it contains both explicit configuration for application A and B, then it is a map for both.

In step 1910 of the flow, aggregation program 1822 (FIG. 18) aggregates, collects and stores application execution data. In a specific implementation, the application execution data is collected on a periodic basis such as at a specified time or at specified time intervals. The monitoring agent programs, sniffers, integrated application code modules, or combinations of these may be configured to automatically report or transmit application status information at a regular time or time interval to the central collection server. This allows the mapping tool to quickly build, on-demand, the application execution map because the data used to build the map will have already been previously collected and stored at the server. For example, when the mapping tool receives a request, such as from a user, for the application execution map to be displayed the map can be quickly constructed because there is no need to wait for the application execution data from the various nodes to traverse the network.

The time interval at which application execution data is collected can range from about 1 second to about 30 seconds, from about 1 minute to about 30 minutes, from about 1 hour to about 6 hours, or from about 12 hours to about 24 hours. For example, application execution data may be collected once every 30 seconds, once every 30 minutes, or once every hour. More frequent collections can provide a more accurate "real-time" map of where the application is executing. However, frequent transmissions of collected application execution data may potentially clog the network. So, generally, the frequency of collections, frequency of transmissions, or both will be based on factors such as desired mapping accuracy, available network bandwidth, and the like. An agent may collect at a high frequency (say machine load every minute) but send to the collection server at a lower frequency (every 10 minutes send the last 10 load measures). Having data collected frequently, but transmitted less frequently can provide a balance or compromise between having an accurate application execution map and helping to prevent network congestion.

As an example, in order to help conserve network resources; a monitoring agent may be configured to report application execution status when the agent detects that the application is executing and not report status when the application is not executing. Alternatively, the agent may be configured to report status even if the application is not executing. Receiving an actual confirmation that an application is not executing can help to ensure that the application execution map is accurately drawn.

In another specific implementation, the application execution data is collected on an as-needed basis. For example, the mapping tool, in response to a user request to display the map, can send a request to the various monitoring agents to report application execution data. The displayed application execution map may include a refresh button that the user can click to refresh the map.

Agents may use an aggregated technique for reporting their states (report to a local node that aggregates local messages then sends them to the main collection server or to another higher level aggregator). This can be useful for large networks to help prevent too high of a load on the collection server and for security reasons where some nodes do not directly have access to the "outside" world and need to explicitly pass through some form of gateway.

Some specific examples of the type of application execution data that may be collected and stored in database 1857 (FIG. 18) include a machine or node identifier such as an address or Internet Protocol (IP) address of the node participating in executing the application, a timestamp indicating when the data was received, the type of network or communication link used or connected to the node (e.g., personal area network (PAN), local area network (LAN), wide area network (WAN), communication protocol, and the like), bandwidth usage, resource usage, or combinations of these. Resource usage may include resources used by the executing application such as CPU usage, memory usage, disk space usage, communication volumes and profile, machine load, and the like.

The collected data may include computer or node configuration information collected by a monitoring agent such as processor speed, processor details (e.g., processor manufacturer), memory capacity and memory details (e.g., type of RAM, available RAM), total disk space, free disk space, operating system, other applications that may be installed at the node, other applications at the node that are executing, and the like.

In a specific implementation, monitoring agents report the connections between nodes participating in the application, so an agent can report the couples of nodes that are communicating (if the agent is bound to a specific node then the list of couples amounts to a list of external nodes with which the agent application node is communicating). The basic data for building the map can be extended with network throughput/usage or latency. For explicit agents (i.e., code added into the application or code executing on a node, but not network sniffing), it is possible to report any value (key/value pairs) desired by the application developer (accessible either in the application process or on the system where the agent is executing).

The central collection server 1820 (FIG. 18) may aggregate values reported by multiple agents. The collected data may include several different data types. In a specific implementation, the basic collected data include node names or IP addresses which can be of a "graph" nature, and aggregating them includes building a map. Some numerical values, such as quantity of resources consumed, for example size of files stored, could be aggregated by adding them. Care is taken to report each consumed resource only once. Other data, such as security certificates or login credentials may be aggregated, where aggregation includes eliminating non-unique values in order to get a list of unique security certificated/login credentials used by the application. As discussed, machine load and other data could be reported as well.

Further, the "machine load" type of value may be aggregated, because application code may be moving around nodes and being executed in different places at different times (cloud computing), and the possibility of multiple agents reporting a given value is anticipated and dealt with correctly. For example, it can be desirable to add loads of different machines to get the total load, but it is generally not desirable to add the load of a given machine multiple times.

Depending on the communication protocols and desired information to be reported, an agent may check if the network connection with the given node is still open even if no data is exchanged.

In step 1915, the mapping tool analyzes the collected application execution data to determine which nodes are participating in executing the application, identify the communication links between the nodes, or both. For example, the mapping tool may scan application execution database 1857 to identify those nodes that are participating in executing the application. As an example, consider Table C below which shows some of the information that may be collected and stored application execution database 1857.

TABLE C

| Node Address | Time |
|---|---|
| 64.233.161.18 | 3:02 p.m. |
| 66.102.1.44 | 1:22 p.m. |
| 72.14.203.91 | 3:04 p.m. |
| 209.85.129.18 | 3:01 p.m. |
| 216.239.37.19 | 2:46 p.m. |

Table C includes columns Node Address and Time. The Node Address column lists the IP address associated with the node. In this example, a monitoring agent at a node detects when the application is executing. Upon detecting the execution, the monitoring agent reports or transmits an IP address associated with the node to the central collection server. The Time column lists the time at which the server received the IP address from the reporting node. Alternatively, the time can be the time at which the monitoring agent detected the application execution.

In a specific implementation, to determine whether or not a node is currently participating in executing the application, the tool compares the time with a current time. The tool may calculate a difference or absolute difference between the time and the current time. If the difference is within a pre-determined duration or threshold time or time window, the tool determines that the reporting node is participating in executing the application. For example, the difference may be less than the threshold duration. The difference may be less than or equal to the threshold duration. If the difference is outside the threshold duration the tool determines that the reporting node is not participating in executing the application. For example, the difference may be greater than the threshold duration. The difference may be greater than or equal to the threshold duration.

For example, assume the current time is 3:05 p.m. and the threshold time is 5 minutes. For first reporting node listed in row one of Table C above, this results in a difference of 3 minutes (i.e., 3:05 p.m.–3:02 p.m.=3 minutes). The difference (3 minutes) is less than the threshold time (5 minutes). Thus, the first reporting node having the IP address "64.233.161.18" is determined to be a participating node.

For second reporting node listed in row two of Table C above, a difference between the time (1:22 p.m.) and current time (3:05 p.m.) is 1 hour and 43 minutes or 103 minutes (i.e., 1:22 p.m.–3:05 p.m.=103 minutes). The difference (103 minutes) is greater than the threshold time (5 minutes). So, the tool determines that the second reporting node having the IP address "66.102.1.44" is not a participating node.

Thus, in this example, first, third, and fourth reporting nodes having the IP addresses "64.233.161.18," "72.14.203.91," and "209.85.129.18," respectively, are determined to be participating nodes. Second and fifth reporting nodes having the IP addresses "66.102.1.44" and "216.239.37.19," respectively, are determined to be non-participating nodes.

A collection node or server may estimate the difference between each node's time and its reference time. On a large distributed application each node might have a different time setting (e.g., wrong time set, wrong or different time zone and combinations of these). Relying on data reception time might not be sufficient, especially in the context of data aggregators and forwarding as discussed above.

A monitoring agent, such as a monitoring agent program on a server or reporting node, may be configured to report the time zone associated with the reporting node. This allows the collection node to account for a reporting node being in a different time zone than the collection node. Thus, the collection node can make the appropriate time adjustments when determining whether the reporting node is a participating or non-participating node.

However, as discussed, a reporting node may have been configured with the wrong time or the time set at a reporting node may not be according to the Coordinated Universal Time (UTC). Thus, in a specific implementation, the system estimates the difference between actual time (the time at the collection server) and the time set on the node. That is, the collection node estimates the skew in clock settings at remote nodes (for all nodes).

In step 1920, the mapping tool builds and displays a map identifying the location of the participating nodes. In a specific implementation, the map may further display the communication links between the participating nodes, other information such as resource usage information, or both.

In a specific implementation, identifying which nodes are currently participating in an application is left as a user configuration in the mapping tool 1823. In this specific implementation, the user selects the duration a node is still considered active after it has communicated with another application node. As discussed above, checking the status of the network connection can be used even when no network activity is detected. The time threshold for a node to be considered as part of the application can also depend on past history of the node. If a node has been often participating in the application (many communications detected in the past), its threshold can be increased as it is assumed it is most likely still participating though temporarily inactive. All these considerations can be combined with an "ageing" factor so the influence of a past event on the present diminishes as the time from the event increases.

Thus, factors or attributes that may be used to determine whether a node is currently participating or not participating in executing an application may be based on time, the frequency of past participation, the frequency of recent past participation, or combinations of these. A factor may be weighted. For example, more recent participation may be weighted more heavily than less recent participation.

In a specific implementation, a method to determine whether a node is participating in executing an application includes receiving a transmission from the node, the transmission being associated with a time. The time may be included with the transmission and may be the time of transmission from the node. Alternatively, the time may be the time the transmission is received. The method further includes calculating a difference between the time and a reference or current time. Comparing the difference with a user-configurable threshold duration. If the difference is less than the user-configurable threshold duration, determining that the node is participating in executing the application. If the difference is greater than the user-configurable threshold duration, determining that the node is not participating in executing the application.

In another specific implementation, a method includes receiving first and second transmissions from first and second nodes, respectively. The first transmission is associated with a first time. The second transmission is associated with a second time. The method further includes calculating a first difference between the first time and a reference time. Comparing the first difference with a first threshold duration. If the first difference is less than the first threshold duration, determining that the first node is participating in executing the application. Calculating a second difference between the second time and the reference time. If the second difference is less than a second threshold duration, determining that the second node is participating in executing the application. The first threshold duration may be different from the second threshold duration. If the first node has participated in executing the application a greater number of times than the second node, the first threshold duration is greater than the second threshold duration. If the first node has participated in executing the application a fewer number of times than the second node, the first threshold duration is less than the second threshold duration.

In another specific implementation, a method to determine whether a node is currently participating in executing an application includes weighting one or more factors. A first factor is associated with receiving a transmission from the node, the transmission being associated with a time. A second factor is associated with a first frequency indicating a number of times the node previously participated in executing the application during a first time period. A third factor is associated with a second frequency indicating a number of times the node previously participated in executing the application during a second time period. A beginning time of the second time period is more recent than a beginning time of the first time period. In other words, the beginning time of the second time period is closer to a current time than the beginning time of the first time period. In this specific implementation, the third factor is weighted more heavily than the second factor to indicate that greater weight is given to more recent application execution participation as compared to less recent application execution participation. The first factor may be weighted more or less than the second factor, third factor, or both.

In another specific implementation, determining "last time of activity" or similar reported by a node may include two separate determinations. A first determination may include determining the mapping into "current time" (i.e., time of the collection server) of a timestamp generated by a remote node. In other words, computing the time difference in order to express any timestamp in "collection server time." A second determination may include determining based on "current time timestamps" if a node does belong or not to the application. The second determination may include a confidence evaluation applied to current time timestamps and may include ageing functions or other heuristics. The first determination may be solved in a more deterministic way, by estimating the time delta between nodes (repeatedly, as time set on nodes can change at any time). The error margin on the first determination may be combined into the heuristics of the second determination.

In another specific implementation, a geographic location of the participating node is determined based on the IP address of the participating node. For example, the mapping tool may use the IP address of the participating node to perform a look-up or a cross-reference against a location database listing IP addresses of computers and their known corresponding geographical locations. A geographical location may include information such as country, region, city, latitude, longitude, ZIP code, area code, county, state, time zone, street or postal address (e.g., address of the data center housing the computing node), or combinations of these.

The location database may be supplied by an external third-party. For example, the external third-party may provide an API that takes as input an IP address submitted by the mapping tool and returns to the mapping tool a geographical location. The system can store the geographical location so that the location can be available for future use. Geolocation for IP addresses can be available for public IP addresses.

Alternatively, the location database may be internal to the system. For example, in a private cloud implementation, a company may have a location database which stores a list of the company's host computer IP addresses and corresponding geographical locations.

Once the geographical location of the participating node is obtained from the location database, the application execution mapping tool can plot the location on a map and display the map on an electronic screen to a user.

In a specific implementation, the map is updated in real-time or near real-time as nodes stop or start participating in executing the application. More particularly, in step 1825, the application execution mapping tool determines that a node previously participating in executing the application is no longer participating in executing the application. For example, for a previous time period the node may have been participating in executing the application. However, for a current time period or a subsequent time period, i.e., a time period after the previous time period, a determination is made that the node is not participating in executing the application. The determination may be based on receiving information from the monitoring agent associated with the node indicating that the node is not participating in executing the application.

Alternatively, the determination may be made based on not having received information from the monitoring agent associated with the node. For example, as discussed above, a monitoring agent may be configured to report if application execution is detected and to not report if application execution is not detected. Thus, in this specific implementation, not having received information from the monitoring agent would indicate that the node is not participating in executing the application.

In step 1935 the system updates the map. In a specific implementation, updating the map includes removing the non-participating node from the map. In other words, the non-participating node is not visible on the updated map. That is, the non-participating node is omitted from the updated map. Thus, in this specific implementation, the map shows participating nodes and non-participating nodes are not shown, are omitted, are hidden, or are not visible.

Omitting the non-participating nodes from the map can help to reduce clutter. For example, in some cases, there may be many nodes which can potentially participate in executing the application. Further, some of these nodes may be geographically very close to each other such as in the same data center. Thus, when the map is displayed non-participating nodes may be overlapping with participating nodes which can make it difficult to distinguish between non-participating nodes and participating nodes. Distinguishing among the different nodes can be especially difficult if the display screen is small or has a low resolution such as a smartphone or tablet screen.

In another specific implementation, updating the map includes changing a visual indicator associated with the node to indicate that the node is not participating in executing the application. In other words, the non-participating node is visible on the updated map, but there is a visual indicator associated with the node to indicate that the node is not participating in executing the application. The visual indicator may be implemented as a shape (e.g., circle or square), icon, color (e.g., red or green), or combinations of these. Thus, for example, on the updated map a red indicator adjacent to the node may indicate that the node is not participating in executing the application. A green indicator may indicate that the node is participating in executing the application.

A benefit of displaying both participating nodes and non-participating nodes is that it can give the user a complete picture of the nodes where the application could potentially be executing and the resources or other nodes that are potentially available for executing the application. This can be of assistance in, for example, load balancing, resource provisioning, and so forth.

In step 1930, tool determines that a node not previously participating in executing the application is now participating in executing the application. The node may be referred to a new node. For example, for a previous time period the node may have not been participating in executing the application. However, for the current or subsequent time period, a determination is made that the node is participating in executing the application. For example, the determination may be made based on receiving information from the monitoring agent associated with the node indicating that the node is participating in executing the application.

In step 1935 the system updates the map. In a specific implementation, updating the map includes adding the now participating node or new node to the map. In other words, the new node may not have been visible on the previous map, but is visible on the updated map. In another specific implementation, updating the map includes changing a visual indicator associated with the node to indicate that the node is now participating in executing the application. In this specific implementation, the node is visible on both the previous map and the current or updated map. However, for the previous map, the visual indicator associated with the node indicates that the node is not participating in executing the application. For the current or updated map, the visual indicator indicates that the node is participating in executing the application. For example, for the previous map, a visual indicator may be displayed in the color red to indicate that the node is not participating in executing the application. For the current or updated map, the visual indicator may be displayed in the color green to indicate that the node is participating in executing the application.

Figure 20:
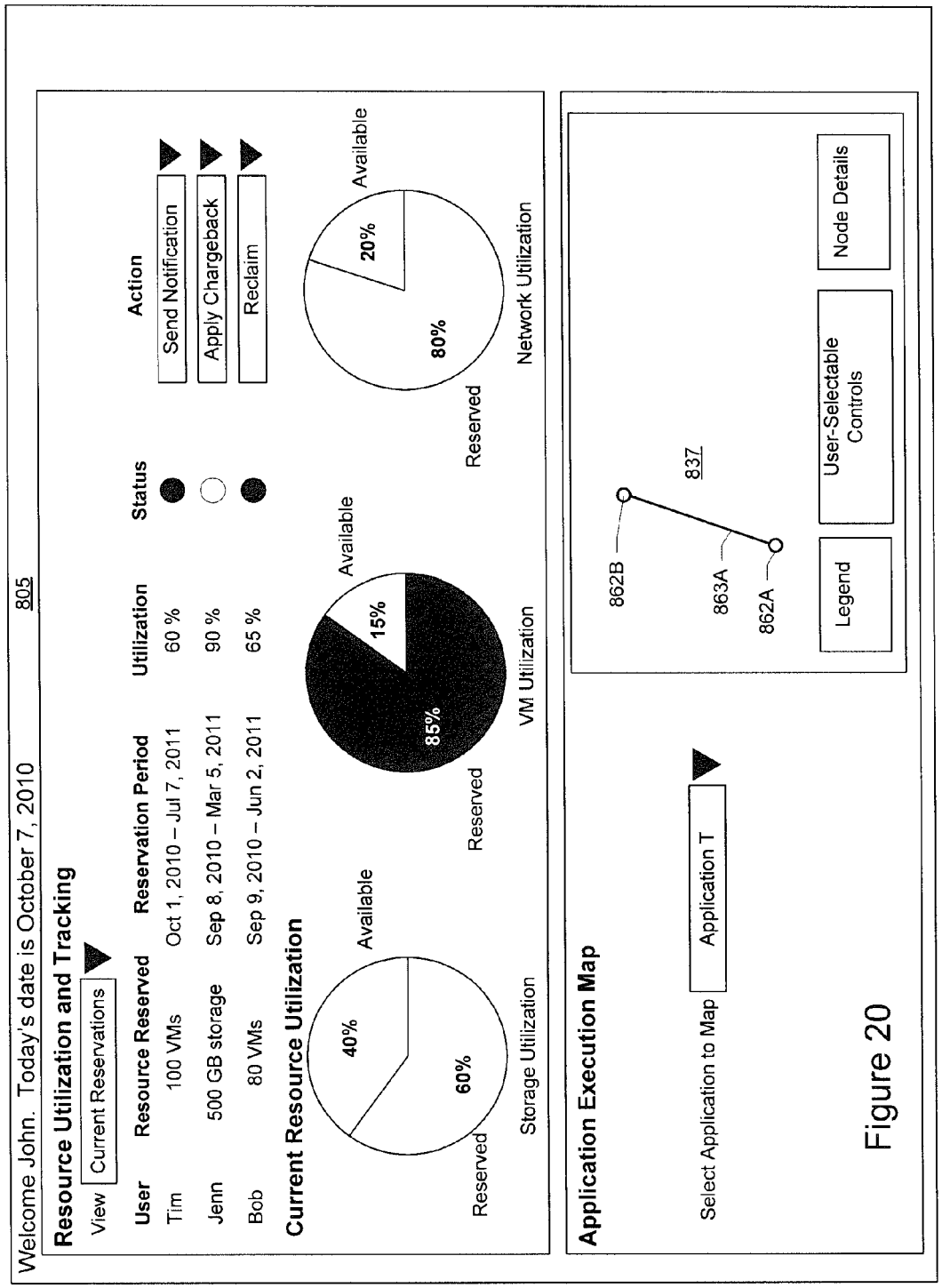
FIG. 20 shows a dashboard display of the management console application including an updated application execution map.

FIG. 20 shows a view of dashboard 805 from FIG. 8 where application execution map 837 has been updated. In this example, the system has determined that one of the nodes (e.g., third node 862C) is no longer participating in executing the application. Thus, in this specific implementation, the third node is omitted or not visible on the updated application execution map.

In a specific implementation, there is a "real-time" use as described in application. In another specific implementation, there is a historical view. The historical view includes an animated map of how an application behaved in the past such as in the past week. Arriving and departing nodes may be visually emphasized by, for example, points popping up and disappearing during the animation. The user controls section may include video controls such as play, forward, rewind, and stop buttons. In this specific implementation, a feature of the application execution map includes providing an animated application execution map. This allows the user to graphically see how the participating and non-participating nodes change over time. Such an application execution map may be referred to as an application execution motion chart.

Figure 21:
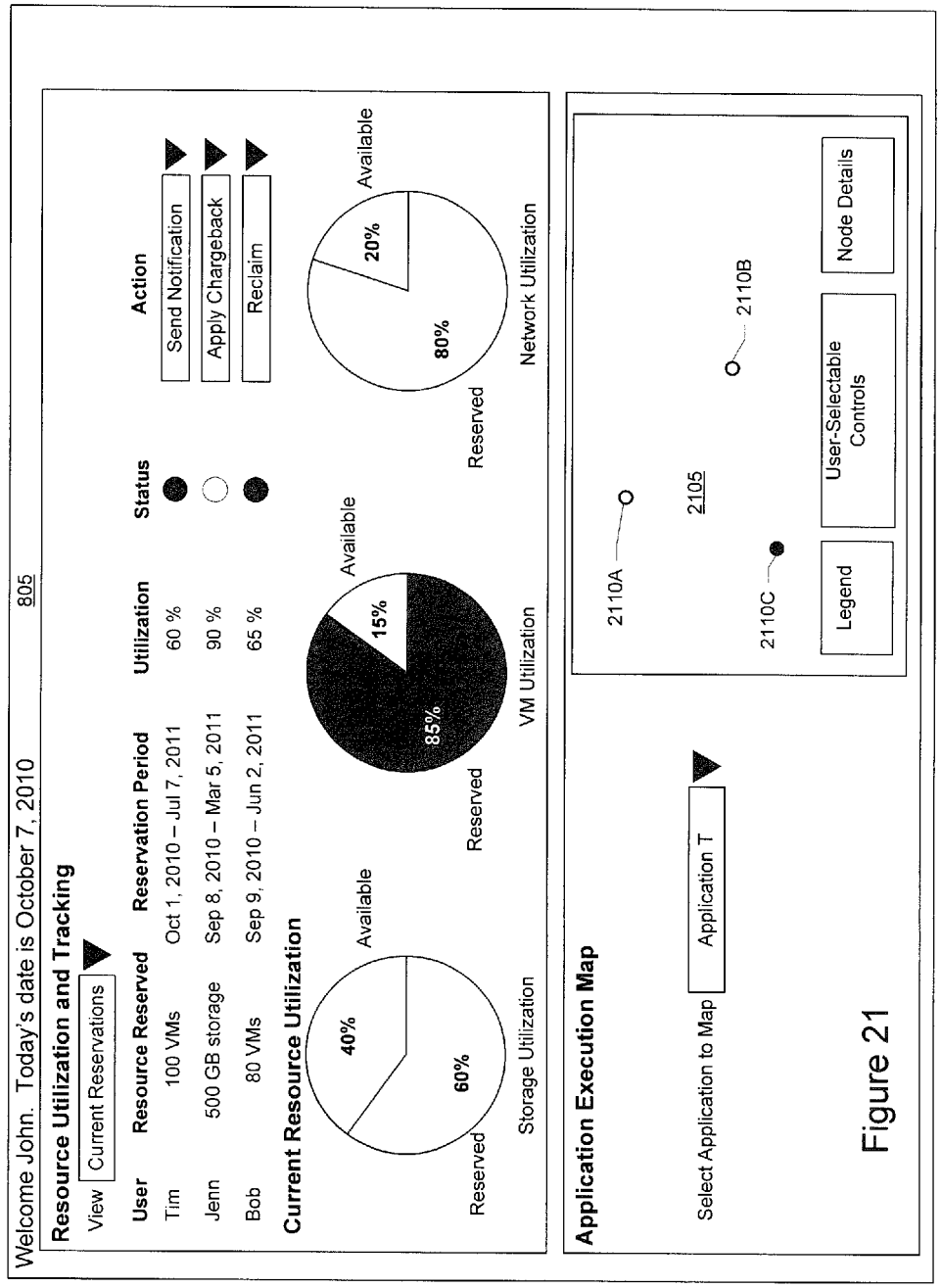
FIG. 21 shows a dashboard display of the management console application including another embodiment of an application execution map.
Figure 22:
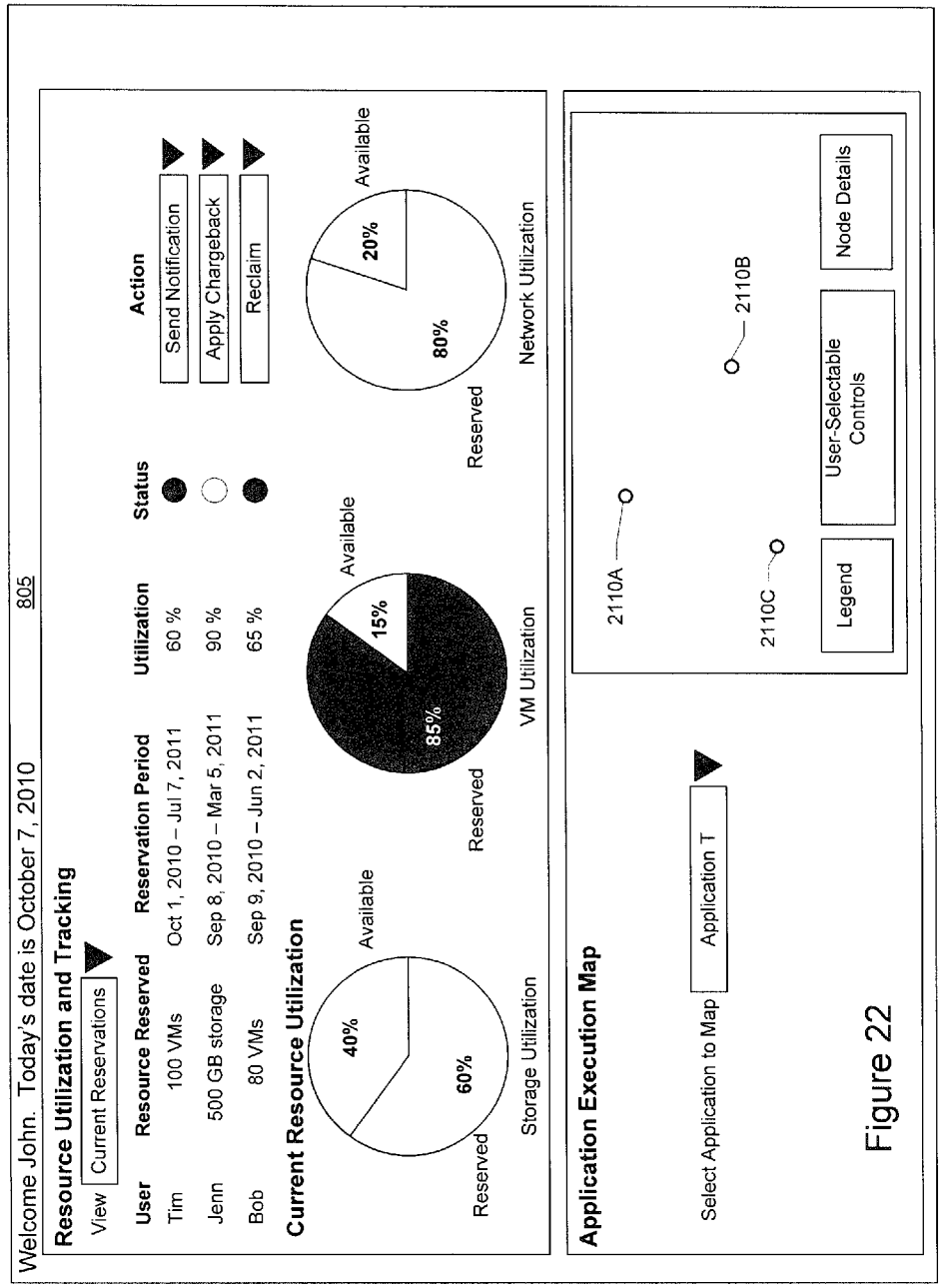
FIG. 22 shows a block diagram of the management console application including another embodiment of an updated application execution map.

FIGS. 21-22 show another specific implementation of an application execution map 2105 within a dashboard. In this specific implementation, a visual indicator such as a color associated with a node is used to indicate whether or not a node is participating in executing an application. This specific implementation also shows an example where the communication links are hidden or not visible. In FIG. 21, first and second nodes 2110A and 2110B are displayed using a first color as indicated by the unfilled circles. A third node 2110C is displayed using a second color, different from the first color, as indicated by the filled circle. The first color can indicate that the node is a participating node. The second color can indicate that the node is a non-participating node.

FIG. 22 shows an example of the application execution map in FIG. 21 having been updated. As shown in this example, the color of third node 2110C has changed from the first color to the second color as indicated by the unfilled circle to indicate that third node 2110C is now currently participating in executing the application. The map displayed to the user may graphically convey some of the information by using for example different colors for different "freshness" degrees of the information. A node that was determined to be participating in the application at some point in the past and not since could be drawn using a different color or shade from nodes found to participate more recently.

For example, an application execution map may include first and second nodes where each node has been determined to be participating in executing the application. Thus, both nodes are displayed in the same color. However, one of the nodes (e.g., first node) may be displayed in a different shade than the other node (e.g., second node) to indicate that the first node has been found to be participating in executing the application more recently than the second node. For example, the first node may be colored dark red and the second node may be colored light red.

In the examples shown in FIGS. 21-22, different colors are used as visual indicators to indicate whether or not a node is participating in executing the application. It should be appreciated, however, that anything that visually distinguishes one node from another node may be used. For example, whether or not a node is participating in executing the application may be indicated by a shape (e.g., square, box, rectangle, or circle), pattern (e.g., checkerboard, solid, or stripes), size, level of saturation (e.g., dark red or light red), color gradient, animation (e.g., nodes that blink are participating in executing the application and nodes that are not blinking or steady are not participating in executing the application), and so forth.

Further, there can be different types of visual indicators to show other information. For example, a type of visual indicator associated with a node may indicate a level of confidence related to whether the node is a participating or non-participating node (see above confidence rating discussion). For example, nodes displayed in green or represented as squares may indicate a high-degree of confidence that the nodes are participating nodes. Nodes displayed in red or represented as triangles may indicate a low-degree of confidence that the nodes are participating nodes.

The application execution maps shown in FIGS. 8 and 20-22 may be referred to as abstract maps or graphs. Some nodes could have as additional data/attributes their geographical information when available. Such information may be shown through a "properties" dialog box or mouse over information. In another specific implementation, the application execution map is superimposed over a geographical map where the position or layout of the nodes correspond to their geographical locations. For example, an application execution map may be superimposed over a geographical map or outline of the United States, France, China, India, or a world map—just to name a few examples.

Depending factors such as the location of the nodes, the application execution map may be imposed over a building map or a campus map. For example, if the nodes are local to each other, such as in the same building, the application execution map may be superimposed over a building map. The building map may identify the different floors and rooms of a building. A geographic location of a node may be based on a particular floor, room, or both of a building. A campus map may identify the different buildings in which a node may be found.

An application execution map can be useful for companies that develop and deliver complex systems and applications that involve a heavily distributed infrastructure, and companies that put a strong emphasis on Cloud computing. In these environments, applications are increasingly distributed with a higher dynamism in the distribution (nodes being frequently added and removed from the system). The flexibility provided by Cloud computing and distributed systems come with a price: complexity. It is desirable that customers be assisted to reduce that perceived complexity.

Providing a synthetic and easy to understand view of a complex configuration is desirable during development, deployment and operation. Such a view tremendously simplifies maintenance issues, allows identifying potential issues before any harm (or downtime) is done, helps in debugging distributed applications, judging and measuring scalability, addressing security concerns (what runs where, who accesses what), etc.

Such a tool helps to reduce Total Cost of Ownership and increase customer "delightment." Historical monitoring data can also serve to understand how use patterns of a system change over time (how the system scales, when does the load appear, etc).

The application execution mapping feature can provide a monitoring and mapping infrastructure that is easily integrated into existing systems and applications in the stacks being deployed. A company's systems and software can be updated to support the monitoring systems. A company's Cloud offering can also integrate such mechanisms (and offer related services) to simplify Cloud deployment for hosted 3rd party applications and make itself a preferred choice for Cloud deployment. Distributed application monitoring and mapping could be offered as a service and be itself hosted in the Cloud. An application execution mapping system may be deployed in a private cloud, public cloud, community cloud, or hybrid cloud. In a specific implementation, an application execution map is displayed within a cloud services management console which may further include information on cloud resource utilization.

As discussed, such maps can be used during application development and debug to get a better picture of where the application is executing. It should be appreciated that map usage is not limited to the cloud environment, and when an application executes inside and outside the cloud, the map can show all the nodes. In a specific embodiment, implementation is done by network sniffing, installation of agents on participating machines, by application instrumentation, or combinations of these. In other words, the methods can be combined as different environments have different constraints of what is possible. In a specific embodiment, there is a centralizing infrastructure to gather the data sent in by the various agents. A map centralization service can be offered in the cloud or elsewhere.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
receiving, at a management console application, first data generated by a first application, wherein the first data comprises an identification of cloud computing resources reserved for an organization, a current utilization value of an amount of the reserved cloud computing resources being utilized by the organization, and an indication that the current utilization value is below a threshold value;
storing the first data in a database of the management console application;
authorizing, by the management console application, a request to access the management console application;
providing, by the management console application, access to the first data from the database after the request is authorized;
displaying, by the management console application, a dashboard comprising the identification of the reserved cloud computing resources, the current utilization value of the amount of the reserved cloud computing resources being utilized by the organization, and a status, wherein the status is for indicating that the current utilization value of the reserved cloud computing resources is below the threshold value; and
displaying on the dashboard, by the management console application, a user-input control comprising a user-selectable action to perform at least one of sending a notification to inform the organization that the current utilization of the reserved cloud computing resources by the organization is below the threshold value and reclaiming at least a portion of the reserved cloud computing resources to be made available to other users within the organization or to other organizations.

2. The method of claim 1 comprising:
receiving, at the management console application, second data generated by a second application, wherein the second data comprises an Internet Protocol (IP) address of a second reserved cloud computing resource, and an identification of a third application determined to be executing on the second reserved cloud computing resource;
storing the second data in the database of the management console application;
providing, by the management console application, access to the second data from the database; and
displaying on the dashboard, by the management console application, an application execution map comprising an icon representing the second reserved cloud computing resource.

3. The method of claim 2 wherein the application execution map comprises a line extending from the icon, wherein the line represents a communication link coupled to the second reserved resource.

4. The method of claim 1 wherein the reserved cloud computing resources comprise a plurality of virtual machines.

5. The method of claim 1 wherein the reserved cloud computing resources comprise an amount of storage.

6. The method of claim 1 wherein the user-input control further comprises a user-selectable action to apply a chargeback to the organization based on the reserved cloud computing resources.

7. A computer program product, comprising a non-transitory computer readable medium having computer-readable program code embodied therein to be executed by one or more processors, the program code including instructions to:
receive, at a management console application, first data generated by a first application, wherein the first data comprises an identification of cloud computing resources reserved for an organization, a current utilization value of an amount of the reserved cloud computing resources being utilized by the organization, and an indication that the current utilization value is below a threshold value;
store the first data in a database of the management console application;
authorize, by the management console application, a request to access the management console application;
provide, by the management console application, access to the first data from the database after the request is authorized;
display, by the management console application, a dashboard comprising the identification of the reserved cloud computing resources, the current utilization value of the amount of the reserved cloud computing resources being utilized by the organization, and a status, wherein the status is for indicating that the current utilization value of the reserved cloud computing resources is below the threshold value; and
display on the dashboard, by the management console application, a user-input control comprising a user-selectable action to perform at least one of sending a notification to inform the organization that the current utilization of the reserved cloud computing resources by the organization is below the threshold value and reclaiming at least a portion of the reserved cloud computing resources to be made available to other users within the organization or to other organizations.

8. The computer program product of claim 7 wherein the program code includes further instructions to:
receive, at the management console application, second data generated by a second application, wherein the second data comprises an Internet Protocol (IP) address of a second reserved cloud computing resource, and an identification of a third application determined to be executing on the second reserved cloud computing resource;
store the second data in the database of the management console application;
provide, by the management console application, access to the second data from the database; and
display on the dashboard, by the management console application, an application execution map comprising an icon representing the second reserved cloud computing resource.

9. The computer program product of claim 7 wherein the reserved cloud computing resources comprise a plurality of virtual machines.

10. The computer program product of claim 7 wherein the reserved cloud computing resources comprise an amount of storage.

11. The computer program product of claim 7 wherein the user-input control further comprises a user-selectable action to apply a chargeback to the organization based on the reserved cloud computing resources.

12. A system for managing cloud computing resources of an organization, the system comprising:
a processor-based database management system, which when executed on a computer system, will cause the processor to:
receive first data generated by a first application, wherein the first data comprises an identification of cloud computing resources reserved for an organization, a current utilization value of an amount of the reserved cloud computing resources being utilized by the organization, and an indication that the current utilization value is below a threshold value;
store the first data in a database of a management console application;
authorize a request to access the management console application;
provide access to the first data from the database after the request is authorized;
display a dashboard comprising the identification of the reserved cloud computing resources, the current utilization value of the amount of the reserved cloud computing resources being utilized by the organization, and a status, wherein the status is for indicating that the current utilization value of the reserved cloud computing resources is below the threshold value; and
display on the dashboard a user-input control comprising a user-selectable action to perform at least one of sending a notification to inform the organization that the current utilization of the reserved cloud computing resources by the organization is below the threshold value and reclaiming at least a portion of the reserved cloud computing resources to be made available to other users within the organization or to other organizations.

13. The system of claim 12 wherein the processor-based database management system is configured to:
receive second data generated by a second application, wherein the second data comprises an Internet Protocol (IP) address of a second reserved cloud computing resource, and an identification of a third application determined to be executing on the second reserved cloud computing resource;

store the second data in the database of the management console application;

provide access to the second data from the database; and display on the dashboard an application execution map comprising an icon representing the second reserved cloud computing resource.

14. The system of claim 12 wherein the reserved cloud computing resources comprise a plurality of virtual machines.

15. The system of claim 12 wherein the reserved cloud computing resources comprise an amount of storage.

16. The system of claim 12 wherein the processor-based database management system is configured to:

display on the dashboard a user-input control comprising a user-selectable action to send a notification to a first user and a second user to inform the first and second users that current utilization of the reserved cloud computing resources is below the threshold value, wherein the reserved cloud computing resources was reserved by the first user and the second user is a manager of the first user.

17. The system of claim 12 wherein the user-input control further comprises a user-selectable action to apply a chargeback to the organization based on the reserved cloud computing resources.

* * * * *